US006868596B2

(12) United States Patent
Reichert

(10) Patent No.: US 6,868,596 B2
(45) Date of Patent: Mar. 22, 2005

(54) METHOD OF FABRICATING MUNTIN BARS FOR SIMULATED DIVIDED LITE WINDOWS

(75) Inventor: Gerhard Reichert, New Philadelphia, OH (US)

(73) Assignee: Edgetech I.G., Inc., Cambridge, OH (US)

(*) Notice: Subject to any disclaimer, the term of this patent is extended or adjusted under 35 U.S.C. 154(b) by 73 days.

(21) Appl. No.: 10/770,293

(22) Filed: Feb. 2, 2004

(65) Prior Publication Data

US 2004/0154248 A1 Aug. 12, 2004

Related U.S. Application Data

(60) Division of application No. 10/176,561, filed on Jun. 21, 2002, now Pat. No. 6,684,474, which is a division of application No. 09/775,074, filed on Feb. 1, 2001, which is a continuation-in-part of application No. 09/637,722, filed on Aug. 11, 2000, now Pat. No. 6,425,221.

(60) Provisional application No. 60/148,842, filed on Aug. 13, 1999.

(51) Int. Cl.[7] .......... B23Q 17/00

(52) U.S. Cl. .......... 29/407.05; 29/407.1; 29/564.6; 29/415; 29/417; 29/469.5; 29/703; 29/787

(58) Field of Search .......... 29/407.05, 407.1, 29/564, 564.1, 564.6, 564.7, 564.8, 33 P, 412, 414, 415, 417, 469.5, 897.15, 703, 783, 787, 791, 795; 52/204.61, 664, 667, 668, 456, 656.5, 656.8; 72/178, 181

(56) References Cited

U.S. PATENT DOCUMENTS

| | | | | | |
|---|---|---|---|---|---|
| 3,308,593 | A | * | 3/1967 | Smith | 52/456 |
| 3,340,661 | A | * | 9/1967 | Krieger | 52/456 |
| 4,783,938 | A | * | 11/1988 | Palmer | 52/171.3 |
| 4,989,384 | A | * | 2/1991 | Kinghorn et al. | 52/456 |
| 5,088,307 | A | * | 2/1992 | Cole | 72/46 |
| 5,099,626 | A | * | 3/1992 | Seeger | 52/314 |
| 5,267,421 | A | * | 12/1993 | Salisbury | 52/314 |
| 5,345,743 | A | * | 9/1994 | Baier | 52/455 |
| 5,351,459 | A | * | 10/1994 | Kassl et al. | 52/656.5 |
| 5,477,647 | A | * | 12/1995 | Yates, Jr. | 52/204.57 |
| 5,494,715 | A | * | 2/1996 | Glover | 428/34 |
| 5,630,306 | A | * | 5/1997 | Wylie | 52/786.13 |
| 5,678,376 | A | * | 10/1997 | Poma | 52/656.8 |
| 6,177,156 | B1 | * | 1/2001 | Glover et al. | 428/34 |
| 6,240,685 | B1 | * | 6/2001 | Eichhorn | 52/204.61 |
| 6,708,384 | B2 | * | 3/2004 | McGlinchy | 29/417 |
| 6,739,101 | B2 | * | 5/2004 | Trpkovski | 52/206 |
| 6,745,460 | B2 | * | 6/2004 | McGlinchy | 29/791 |
| 2002/0102370 | A1 | * | 8/2002 | Glover et al. | 428/34 |
| 2002/0108228 | A1 | * | 8/2002 | McGlinchy | 29/417 |
| 2002/0138964 | A1 | * | 10/2002 | McGlinchy | 29/469.5 |

* cited by examiner

*Primary Examiner*—David P. Bryant
(74) *Attorney, Agent, or Firm*—Zollinger & Burleson Ltd.

(57) ABSTRACT

A method for fabricating muntin grid pieces includes steps that attach a pair of material strips to opposed edges of the muntin bar element. The material strips may be provided in side-by-side strips that may be separated an simultaneously applied to the opposite sides of the muntin bar element. The connection between the material strips and the muntin bar element may be made with an adhesive or a mechanical connection. The method allows the material strips to be connected to the muntin grid pieces before the muntin grid pieces are assembled into a muntin bar grid for a window.

33 Claims, 17 Drawing Sheets

FIG-8
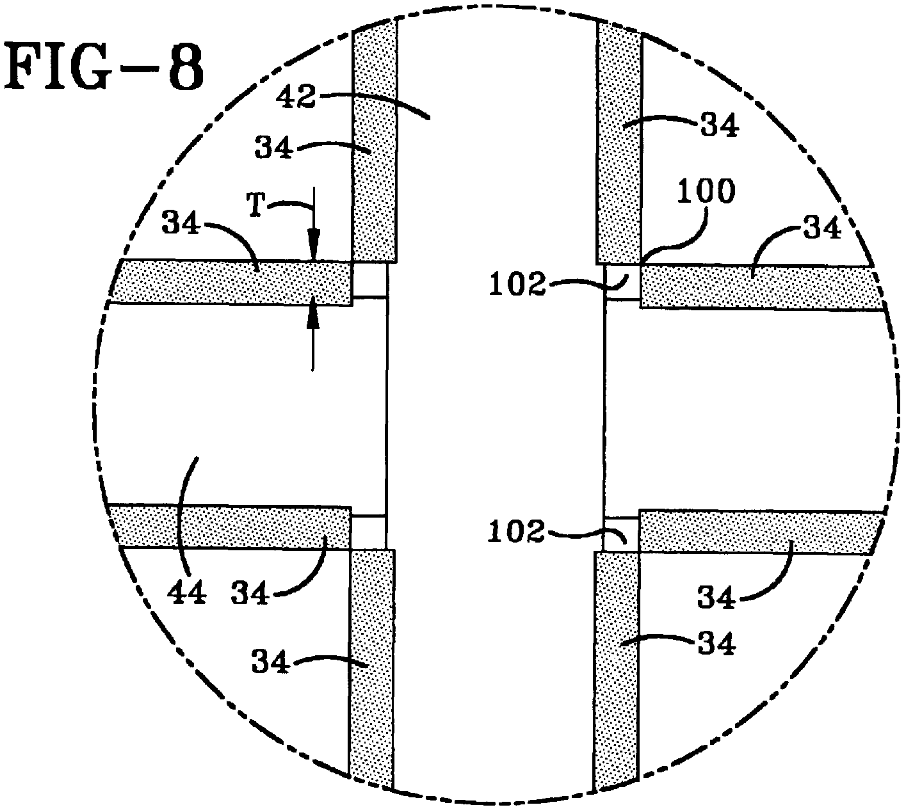
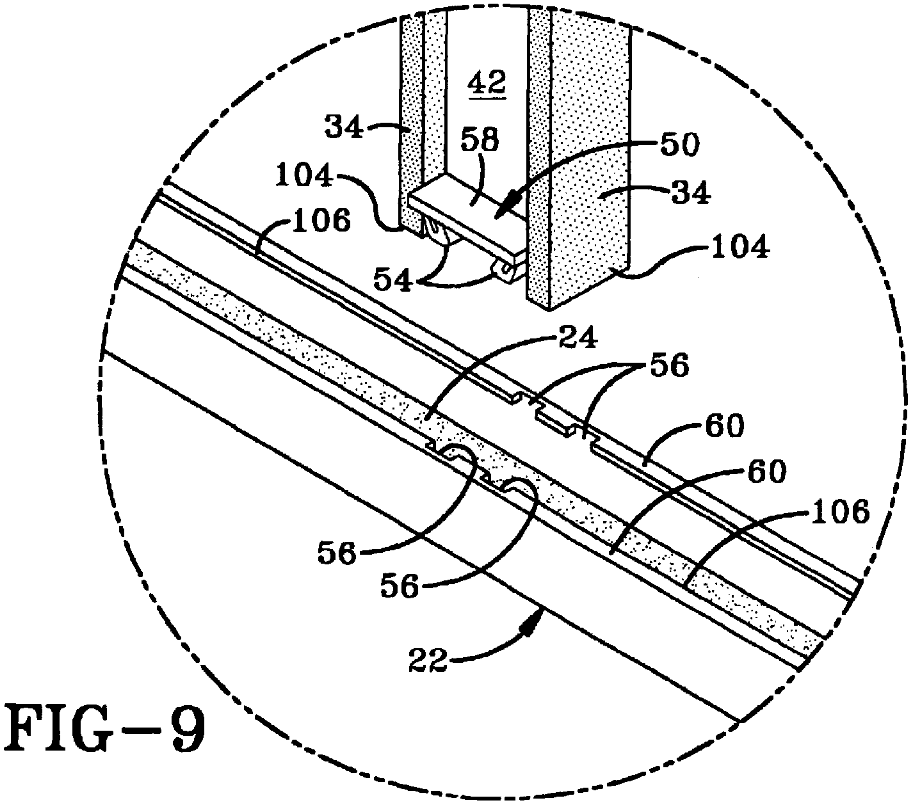
FIG-9

METHOD OF FABRICATING MUNTIN BARS FOR SIMULATED DIVIDED LITE WINDOWS

CROSS REFERENCE TO RELATED APPLICATIONS

This application is a divisional application of U.S. patent application Ser. No. 10/176,561, filed Jun. 21, 2002, now U.S. Pat. No. 6,684,474, which is a divisional application of U.S. patent application Ser. No. 09/775,074, filed Feb. 1, 2001, which is a continuation-in-part application of U.S. patent application Ser. No. 09/637,722, filed Aug. 11, 2000, now U.S. Pat. No. 6,425,221, which is a non-provisional application of U.S. Provisional Application No. 60/148,842, filed Aug. 13, 1999; the entire disclosures of which are incorporated herein by reference.

BACKGROUND OF THE INVENTION

1. Technical Field

This invention generally relates to windows having muntin bars that simulate the appearance of traditional divided lite windows having individual panes of glass set in wooden muntin bars. More particularly, the present invention relates to a method of fabricating muntin bars on automated machinery for use in simulated divided lite windows. Specifically, the present invention relates to a method of automatically sizing, cutting, and joining foam strips to the top and bottom edges of traditional thin metal inner muntin grid elements for use in insulating windows having outer muntin bars positioned in coincidental alignment with the inner muntin bars. The invention also relates to the structure of the muntin bars.

2. Background Information

Traditional windows have individual panes of glass separated by wooden muntins. While these windows are attractive and have functioned for many years, they are relatively expensive to fabricate. The expense is particularly high when a consumer desires an insulating window having spaced panes of glass sealed together by a perimeter spacer. A single window having twelve panes of glass requires twelve spacers, twenty-four panes of glass, and a precisely formed muntin grid. In addition to the cost of materials, the assembly process is also relatively expensive. Thus, although consumers desire the aesthetic properties of traditional divided lite windows, most are unwilling to pay for a true divided lite window.

Modern, energy efficient insulating windows include at least two panes of glass separated by a spacer to form a sealed cavity that provides insulating properties. These insulating windows are most efficiently manufactured with two large panes of glass separated by a single spacer disposed at the perimeter of the panes. Various solutions have been implemented to provide the divided lite appearance in insulating windows. One solution to the problem has been to place a muntin bar grid between the panes of glass. Another solution has been to place the muntin bar grid on the outer surface of one, or both, panes of glass. Although these solutions provide options for consumers, each has visual drawbacks when compared with traditional muntin bars.

Placing muntin bar grids between the panes of glass is one of the most common solutions to the divided lite problem. In fact, so many internal muntin grids are fabricated that automated muntin bar manufacturing equipment has been created and is used in the art. This equipment works in cooperation with the automated window manufacturing equipment. In this equipment, the user inputs the desired size of window and the computer automatically selects the ideal number of grid intersections to form an aesthetically pleasing muntin bar grid. In other embodiments, the user may override the automatic selection and manually select the number of muntin bar intersections in the grid. The computer then controls automated fabricating equipment that roll forms flat metal stock into the hollow, substantially rectangular muntin bars used to form the muntin bar grid. The muntin bars are dadoed or notched at their intersections half-way through their thickness to provide the overlapping joint required to form the grid. These notched areas are also automatically formed. The muntin bars are then cut to length and an assembler manually assembles the bars into a grid that is mounted to the spacer that spaces the inner and outer panes of glass. The muntin bar grid is attached to the spacer with specially designed clips that fit into holes punched into the spacer during the manufacture of the spacer. These systems allow muntin bar grids to be quickly and easily manufactured for a relatively low price after the user invests in the automated equipment. The muntin bar grids are painted and deburred to have a pleasing appearance either before or after the grid is assembled.

One product developed by Edgetech I. G. of Cambridge, Ohio, in response to the insulating window muntin bar problem includes the use of a pair of material strips positioned on the upper and lower edges of metal muntin bars inside an insulating window assembly. Outer muntin bars are then provided in coincidental alignment with the inner muntin bars to achieve a simulated divided lite appearance. The material strips visually join the aligned outer muntin bars to create the appearance that the muntin bar grid extends entirely through the insulated window assembly. This product also hides the metal muntin bars. The metal muntin bars thus do not have to be painted and may be fabricated from a lower quality material than exposed, painted inner metal muntin bars. Although this product achieved acceptance by the consumer because of its visual appearance, the insulating window manufacturers objected to the relatively large amount of labor required to size, cut, and install the material strips. It is thus desired in the art to provide a method for sizing, cutting, and installing the material strips to muntin bars that are fabricated with automated machinery.

Another problem encountered with this product occurs when the material strips are stretched during installation or applied to the outside of a curved muntin. It has been found that the strips relax overtime and delaminate causing the window to have an unattractive appearance. It is desired in the art to provide a solution to this delamination problem.

SUMMARY OF THE INVENTION

In view of the foregoing, it is an objective of the present invention to provide a method for fabricating muntin bars for simulated divided lite windows.

Another objective of the present invention is to provide a method for creating muntin bars for simulated divided lite windows wherein material strips are automatically sized, cut, and applied to the muntin grid elements that are then assembled into a muntin bar grid.

Another objective of the present invention is to provide a method for creating muntin bars for simulated divided lite windows wherein the muntin grid elements are roll formed from metal stock and automatically cut to length with the material strips being fabricated based on the data used to roll form the muntin grid elements.

Another objective of the present invention is to provide a method for fabricating a muntin bar grid wherein the person fabricating the grid only needs to provide the window size and the number of desired panes as well as to assemble the muntin bar grid after the individual muntin grid pieces are fabricated.

Another objective of the present invention is to provide a method for fabricating a muntin bar grid wherein muntin grid elements are provided and measured, with the measurements being used to fabricate the material strips that are then applied to the grid elements.

Another objective of the present invention is to provide a method, as above, wherein opposed strips of material are simultaneously cut to length and applied to the grid element.

Another objective of the present invention is to provide a method, as above, wherein the strips of material are formed with flaps that cover a portion of the muntin clips when the insulating glazing unit is assembled.

Another objective of the present invention is to provide a method wherein the strips of material include a non-extensible material to prevent the strips from stretching during installation.

Another objective of the present invention is to provide foam strips for use with muntin bars wherein the foam strips have a non-extensible material connected to the foam strip to prevent the foam strip from stretching when it is used around curves.

Another objective of the present invention is to provide strips for use with muntin bars wherein a mechanical connection is formed between the strips and bars to help prevent delamination.

A further objective of the present invention is to provide a method of fabricating muntin bars for simulated divided lite windows that achieves the stated objectives in a simple, effective, and inexpensive manner that solves the problems, and that satisfies the needs existing in the art.

These and other objectives and advantages of the present invention are obtained by a method for fabricating muntin grid pieces wherein each muntin grid piece includes a muntin grid element and a pair of material strips connected to opposed edges of the muntin grid element; the muntin grid pieces being capable of being assembled into a muntin bar grid for a window; the method including the steps of: (a) providing a muntin grid element having a length; (b) providing material strip stock having a pair of connected material strip lengths; (c) simultaneously cutting the material strip stock to a length related to the length of the muntin grid element; (d) separating the pair of connected material strip lengths to provide a pair of material strips; and (e) connecting the pair of material strips to the muntin grid element to form a muntin grid piece.

Other objectives and advantages of the invention are achieved by a method for fabricating a muntin bar grid for a window including the steps of: (a) providing at least two muntin grid elements; (b) providing at least two material strips; (c) connecting at least one material strip to each of the muntin bars to form muntin grid pieces; and (d) assembling the muntin grid pieces together to form a muntin bar grid after the material strips are connected to the muntin grid elements.

Other objectives and advantages of the invention are achieved by a muntin grid piece assembly for a muntin grid; the muntin grid piece including: at least one muntin grid element having a width, a thickness, and a longitudinal length; the muntin grid element having first and second ends separated by the longitudinal length of the muntin grid element; the muntin grid element further having first and second edges separated by the width of the muntin grid element; a first clip connected to the first end of the muntin grid element; and at least a first material strip connected to the first edge of the muntin grid element; the first material strip having a first flap that covers at least a portion of the first clip.

Other objectives and advantages of the invention are achieved by a material strip for a muntin grid piece in a simulated divided lite muntin bar grid, the material strip including: a body having a width, a thickness, and a longitudinal length; and a non-extensible member connected to the body and extending in the longitudinal direction.

Other objectives and advantages of the invention are achieved by a muntin grid piece for a muntin bar assembly; the muntin grid piece including: at least one muntin grid element having a width, a thickness, and a longitudinal length; the muntin grid element having first and second ends separated by the longitudinal length of the muntin grid element; the muntin grid element further having first and second edges separated by the width of the grid element; at least a first material strip connected to the first edge of the muntin grid element; and the first material strip being mechanically connected to the muntin grid element.

BRIEF DESCRIPTION OF THE DRAWINGS

The preferred embodiments of the invention, illustrative of the best mode in which applicants contemplate applying the principles of the invention, are set forth in the following description and are shown in the drawings and are particularly and distinctly pointed out and set forth in the appended claims.

FIG. 8 is a front elevational view of one of the intersections of the muntin bar grid of FIG. 7.

FIG. 9 is a perspective view of one end of one of the muntin bars showing the flaps extending over a portion of the muntin bar clips.

Similar numbers refer to similar parts throughout the specification.

DESCRIPTION OF THE PREFERRED EMBODIMENTS

Figure 1:
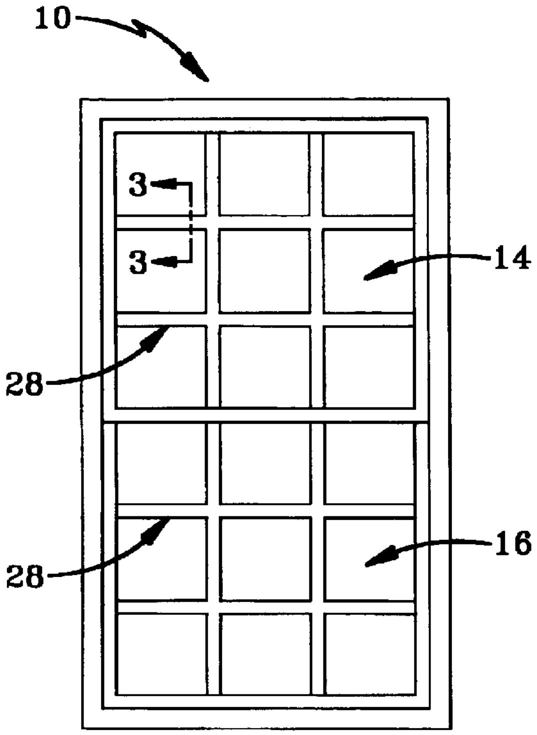
FIG. 1 is a front elevational view of a simulated divided lite window having an upper and lower muntin bar grid formed with two vertical and two horizontal muntin bars.
Figure 2:
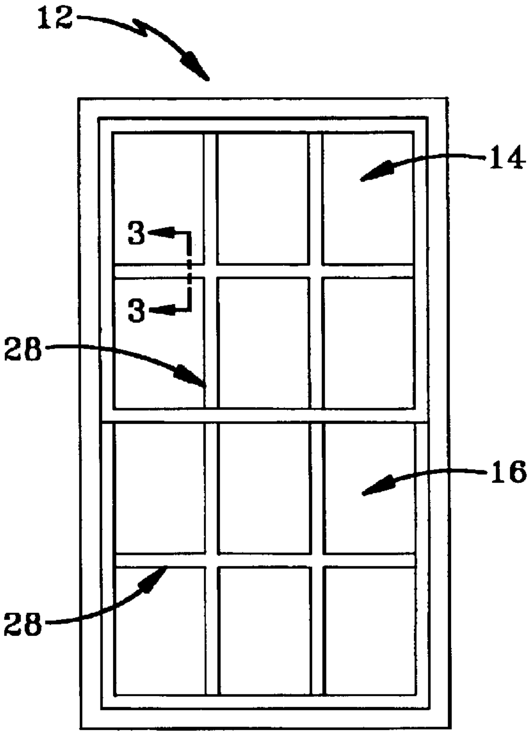
FIG. 2 is a view similar to FIG. 1 showing a window having an upper and lower muntin bar grid with each muntin bar grid being formed with two vertical and one horizontal muntin bar.

Windows having muntin bar grids fabricated according to the concepts of the present invention are indicated generally by the numerals 10 and 12 in FIGS. 1 and 2, respectively. Window 10 is an insulating window having an upper sash 14 and a lower sash 16. Each sash 14 and 16 includes a pair of glass sheets 18 and 20 that are spaced apart by a perimeter spacer 22 having a desiccant matrix 24 (see FIG. 10). Other perimeter spacers 22A and 22B (FIGS. 11A and 11B) may also be used without departing from the concepts of the present invention. As discussed above in the Background of the Invention section of this Application, this type of insulating window is desired by consumers because of its energy saving properties. As also discussed above, consumers desire the appearance of traditional windows fabricated from multiple glass panes mounted in a wooden muntin bar grid. If window 10 were manufactured in the traditional method, eighteen panes of glass would be required in addition to two intricately formed wooden muntin bar grids. Window 12 would also require the two intricately formed muntin bar grids but would only require twelve panes of glass. If window 10 were fabricated with insulating units mounted in traditional muntin bar grids, thirty-six panes of glass and eighteen spacers would be required. Similarly, window 12 would require twenty-four panes of glass with twelve spacers. It may thus be understood why it is desired to utilize muntin bar grids that simulate the appearance of traditional muntins while allowing each window 10 and 12 to be fabricated using only four panes of glass and two spacers.

Figure 3:
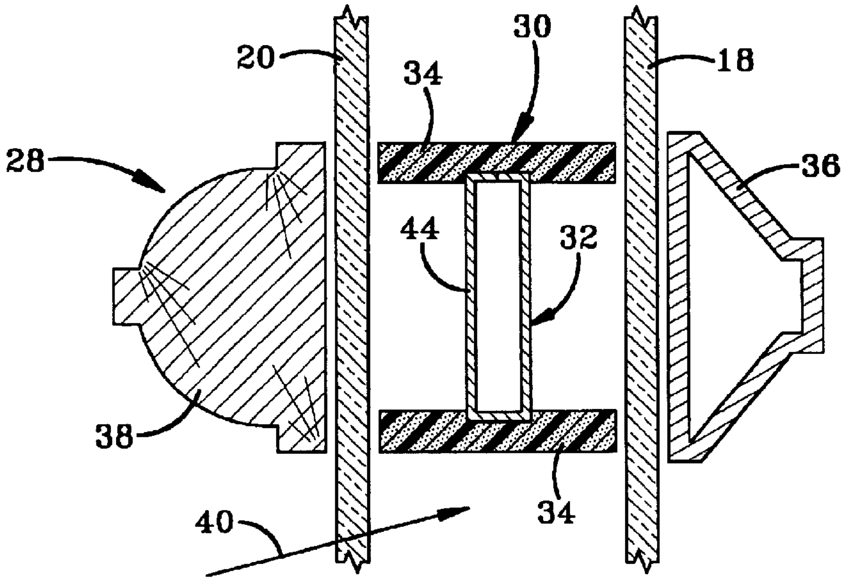
FIG. 3 is a sectional view taken along line 3—3 of FIG. 1 or FIG. 2.

The muntin bar arrangement 28 made in accordance with the concepts of the present invention is used in windows 10 and 12 and depicted sectionally in FIG. 3. Muntin bar arrangement 28 includes a muntin bar grid 30 having an inner muntin grid 32 in combination with a plurality of material strips 34 that serve to visualize join an outer muntin bar 36 with an inner muntin bar 38. By "visually join," it is meant that a person viewing window 10 or 12 along a line, such as that indicated by the numeral 40 in FIG. 3, essentially sees a continuous surface between inner muntin bar 38 and outer muntin bar 36 even though muntin bars 36 and 38 are separated by glass sheets 18 and 20 and material strip 34. Although foam material strips capable of being used to form this muntin bar grid configuration were sold by Edgetech, I. G., of Cambridge, Ohio, in 1994, and are prior art to the present application, the prior method of creating the muntin bar grid was manual, relatively time consuming, and thus relatively expensive. The method of the present invention allows material strips 34 to be efficiently created and efficiently applied to inner muntin grid 32.

In one embodiment of the method of the present invention, the window designer merely needs to input the height and width of a sash along with the number of muntin bar divisions desired for the window. For instance, each sash 14 and 16 of window 10 has a height, a width, and nine divisions. Each sash 14 and 16 of window 12 has a height, a width, and six divisions. The method of the present invention uses this information to automatically form the vertical 42 and horizontal 44 muntin grid elements of inner muntin grid 32 and material strips 34. The method of the present invention also provides that material strips 34 are automatically connected to muntin grid elements 42 and 44 so that grid 30 may be readily assembled.

Figure 4:
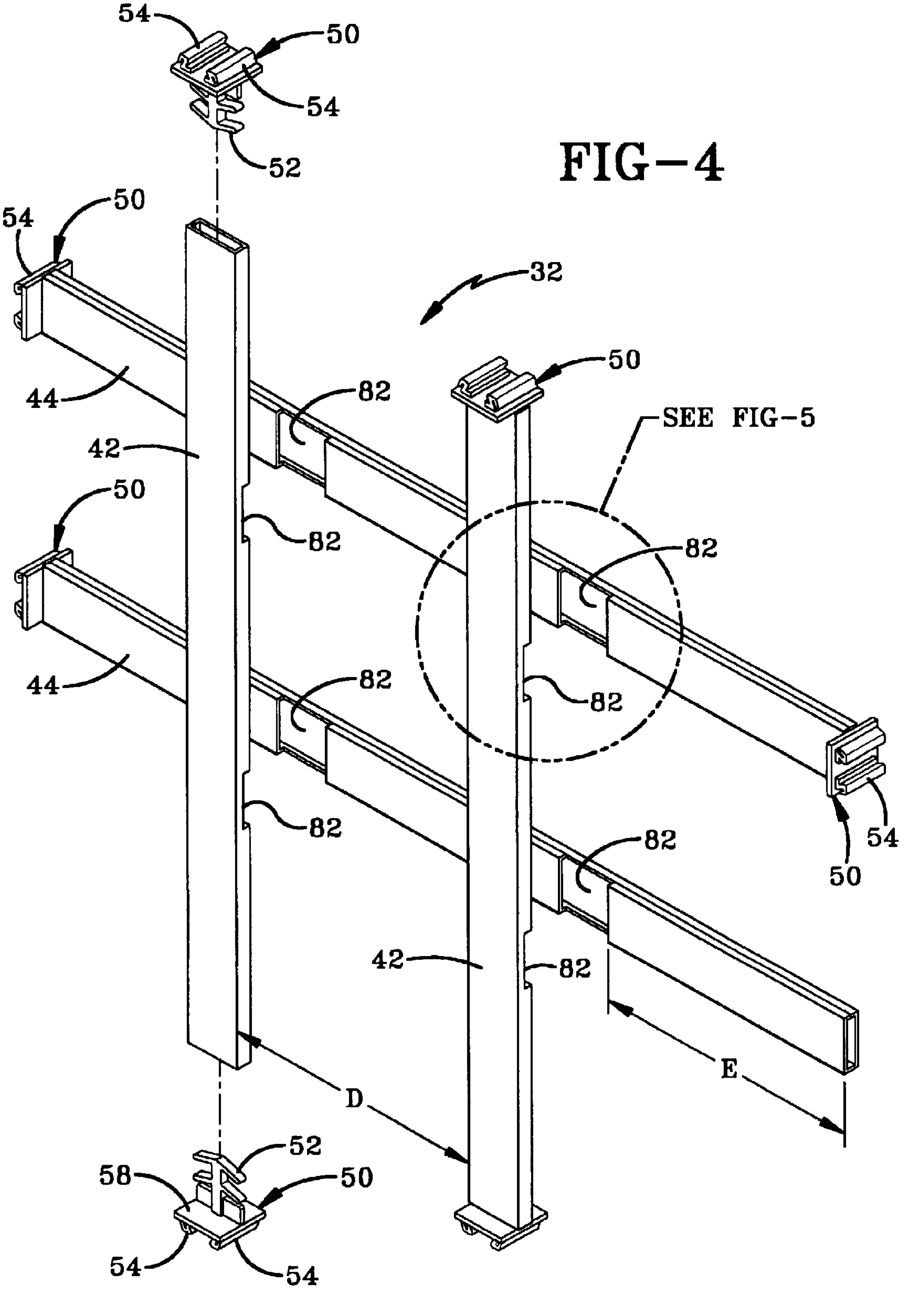
FIG. 4 is an exploded perspective view of the muntin bar grid of FIG. 1.

An exploded view of inner muntin grid 32 is depicted in FIG. 4 in combination with the muntin clips 50 that are used to secure muntin bar grid 30 to spacer 22. Each clip 50 includes an attachment leg 52 that is frictionally received in the end of muntin grid element 42 or 44. Each clip 50 further includes a pair of hooks 54 that are each sized and configured to be received in cutouts 56 in spacer 22. Each clip 50 further includes a plate 58 that supports attachment leg 52 and hooks 54. Plate 58 rests on the upper surface 60 of spacer 22 when clips 50 are installed. In the past, plates 58 were readily visible after a window using clips 50 was assembled.

Figure 12:
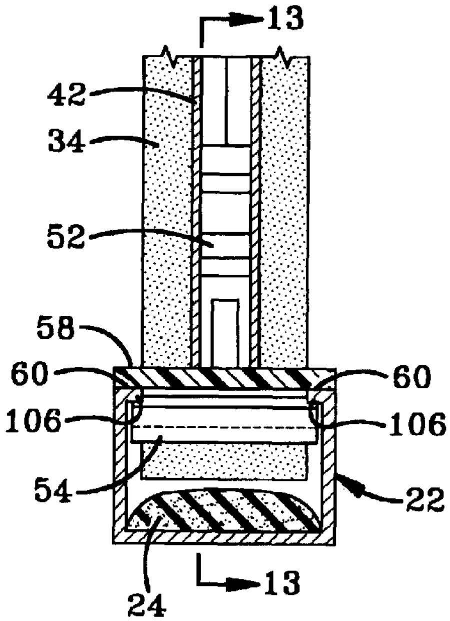
FIG. 12 is a sectional view taken along line 12—12 of FIG. 11.

In one embodiment of the invention, each muntin grid element 42 and 44 is preferably fabricated from raw metal stock that is roll formed to have a substantially hollow rectangular cross section as depicted in FIGS. 3 and 12. It should be noted that some window configurations may only have a single muntin bar instead of a plurality of intersecting bars. The roll forming apparatus used to fabricate muntin grid elements 42 and 44 and the operation of the apparatus is known to those skilled in the art. The roll forming equipment allows the operator to input a window size either manually or it receives a window size as part of a large order that has been fed into a control computer ahead of time. The computer has at least a CPU, a storage device such as a disk drive, and memory that have programs or other instructions saved thereon that receive the inputted data and perform calculations on the data to provide instructions to the roll forming apparatus. The computer allows the user to input a grid pattern, allows the user to select a grid pattern from pre-defined selections, or automatically sizes the grid from preset criteria. The grid selected for the window may have a number of vertical elements 42 and a number of horizontal elements 44 that must be punched, roll formed, and cut to length so that they can be fit together in grid form.

Figure 14:
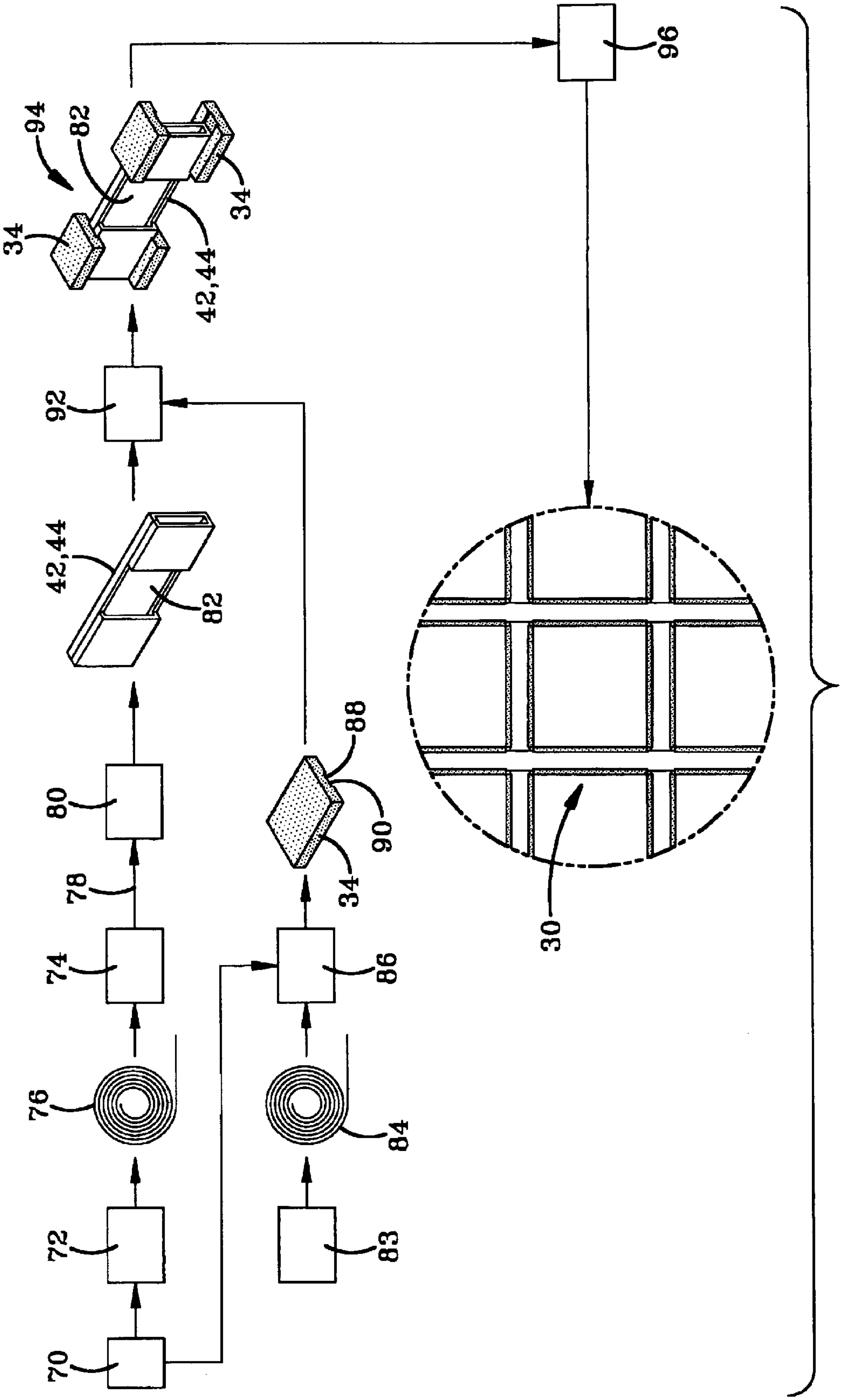
FIG. 14 is a schematic view showing the method of manufacturing the muntin bar grid according to one embodiment of the present invention.

A schematic view of this process is depicted as part of FIG. 14. In FIG. 14, a controller or computer 70 is provided that controls the formation of elements 42 and 44. A supply of raw material 72 is provided and is fed into punching equipment 74. For instance, raw material 72 may be a coil of metal stock 76. In other embodiments, raw material 72 may be a supply of other material that may be roll formed and may be stored in configurations other than rolled coils. Punching equipment 74 is controlled by controller 70 to punch openings in the raw material before the raw material is roll formed. The openings are precisely located to form notches 82 that allow muntin grid elements 42, 44 to be fit together in grid form. Punched material 78 is then roll formed by roll forming apparatus 80 resulting in muntin grid elements 42, 44. The material may be cut to length before or after roll forming. Suitable attachment devices fit within notches 82 to connect elements 42 to elements 44. In the past, elements 42 and 44 had to be deburred and painted before grid 32 was assembled. These processes are expensive and increase the fabrication time. In addition, the painted elements had to be carefully handled to avoid scratching and chipping.

Muntin grid elements 42 and 44 are manually assembled into grid 32 after they are fabricated. In the prior art, material strips 34 were fabricated and manually applied to the outer surfaces of muntin grid elements 42 and 44 to form muntin bar grid 30 only after grid 32 was formed. In the present invention, equipment is provided that cooperates with the equipment used to form elements 42 and 44 that automatically forms material strips 34. In one embodiment, the equipment automatically applies material strips 34 to elements 42 and 44 so that grid 30 may be created simply by connecting elements 42 and 44 together into the proper grid pattern.

A supply of raw material strip stock 83 is supplied preferably in the form of a coil 84 that is fed into a cutting apparatus 86. Cutting apparatus 86 is in communication with controller or computer 70 and the window data used to form elements 42 and 44 is used to control cutter 86 to provide material strips 34 of the proper length to be used to form grid 30.

Material strips 34 are preferably formed from a flexible foam material. Other materials known in the art may also be used to form strips 34. Material strips 34 may carry a desiccant to adsorb moisture. Material strips 34 preferably may be provided with an inwardly facing channel 88 that is used to position material strip 34 on grid element 42 or 44. In one embodiment, an adhesive 90 is located in channel 88 to connect material strip 34 to element 42 or 44. Adhesive 90 may be pressure sensitive adhesive or any of a variety of adhesives known in the art. Material strips 34 may also be provided in a variety of colors allowing the window manufacturer to select different looks for its windows. In another embodiment, a mechanical connection is formed between strips 34 and the elements as is described below.

In the embodiment of the invention depicted in FIG. 14, a laminating machine 92 is provided that automatically joins material strips 34 to elements 42, 44 after material strips 34 and elements 42, 44 are formed. This results in a muntin grid piece 94 that is a combination of one element 42, 44 and two material strips 34. Grid pieces 94 need only be assembled during an assembly step 96 to form grid 30. In another embodiment of the invention, laminating machine 92 is replaced by a manual step where the manufacturer manually applies material strips 34 to element 42, 44 to provide pieces 94.

The dimensions of window 10 or 12 and the selected grid pattern allow controller 70 to automatically calculate the lengths of material strips 34 as well as the total number of strips 34 that are required to form grid 32. Controller 70 determines the length of each strip 34 by first determining whether or not the location of strip 34 is an internal location (between grid intersections) or an external location (between a grid intersection and spacer 22). For internal material strips 34, the length is calculated by taking the total distance "D" between the edges of adjacent grid elements (such as adjacent vertical grid elements 42 depicted in FIG. 4) and subtracting twice the thickness "T" of material strip 34 between its outer surface and the inner surface of channel 88. Calculating the length in this manner and properly positioning material strips 34 on elements 42 and 44 locates the outer corners 100 of material strips 34 adjacent one another to form a continuous corner that is visible to a person looking at grid 30. This method also saves material by leaving spaces 102 at each corner. For instance, if dimension "T" is one eighth of an inch, one inch of material is saved at each joint intersection because eight material strips 34 are used.

Figure 10:
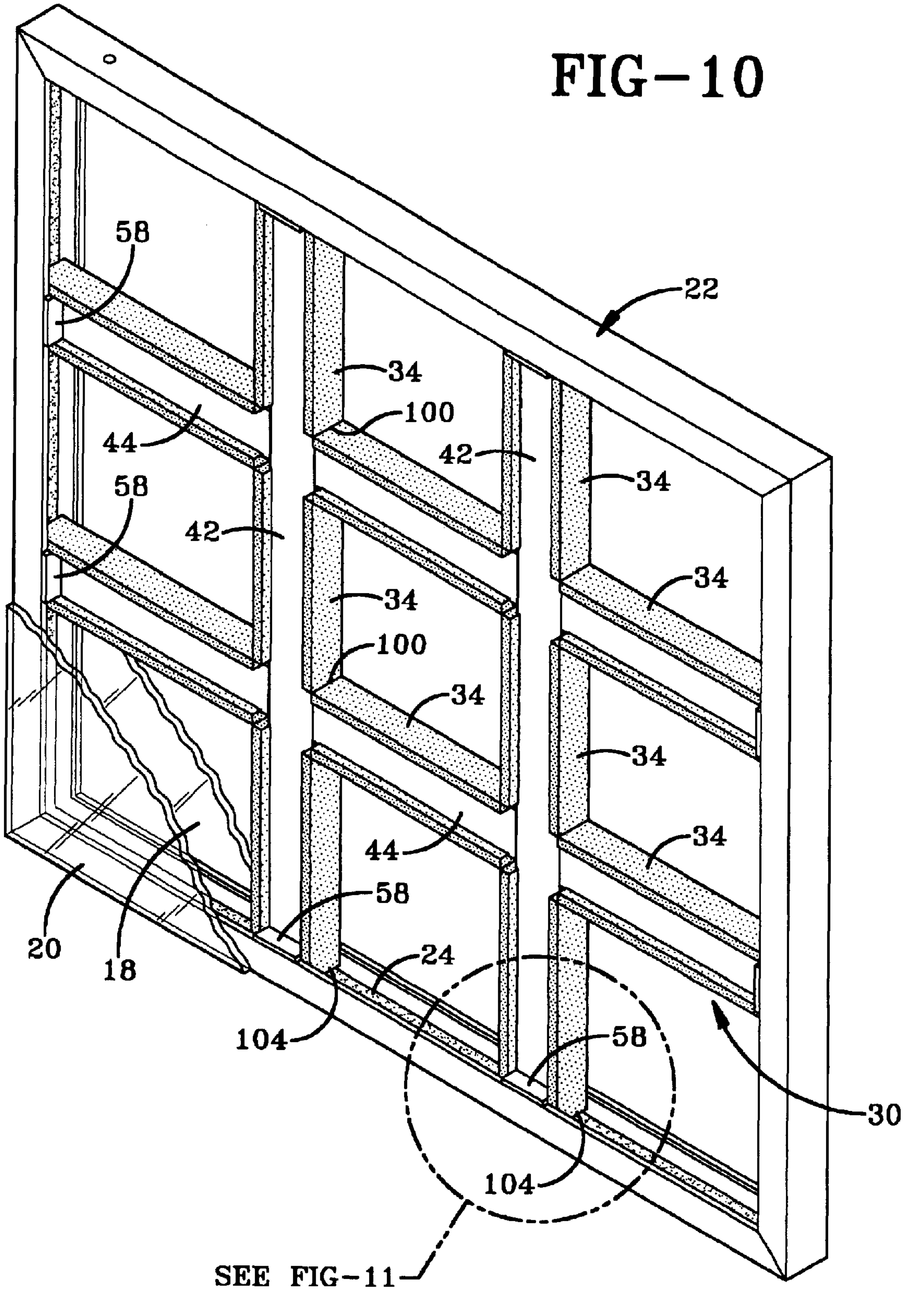
FIG. 10 is a perspective view of an insulating glazing unit with the glass sheets broken away showing the material strip flaps disposed in the spacer.
Figure 11:
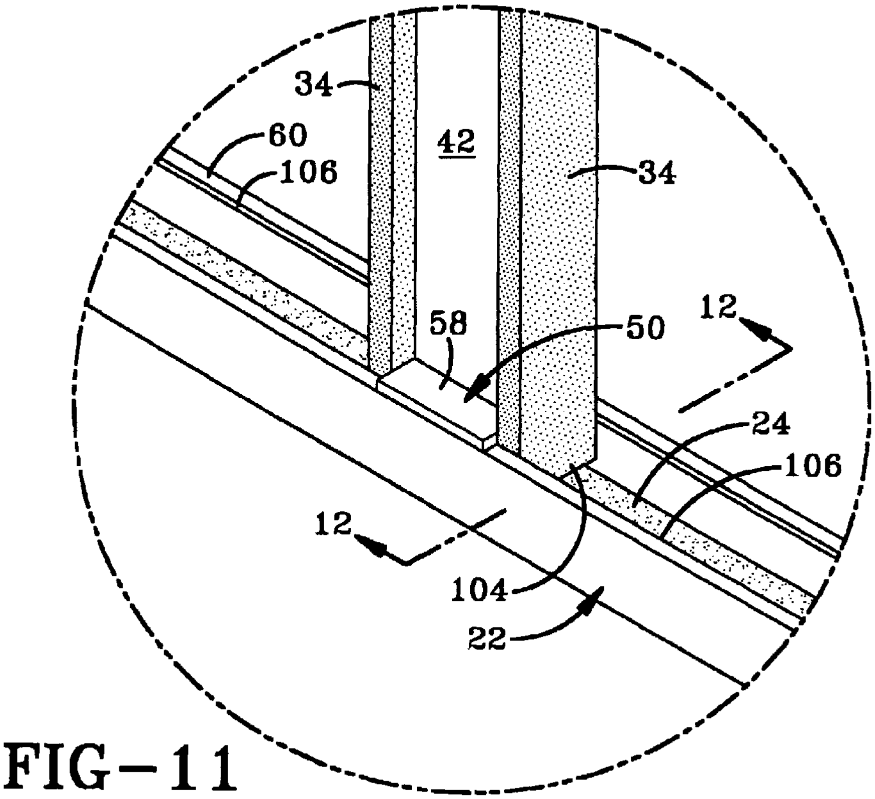
FIG. 11 is an enlarged perspective view of the encircled portion in FIG. 10.
Figure 13:
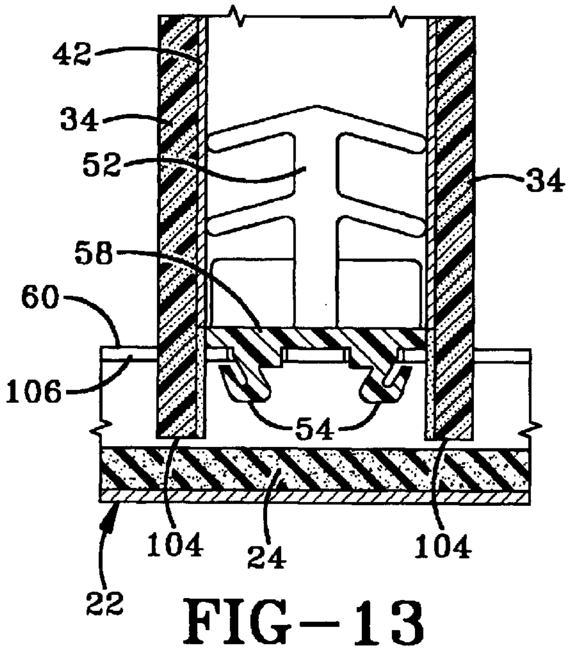
FIG. 13 is a sectional view taken along line 13—13 of FIG. 12.
Figure 11A:
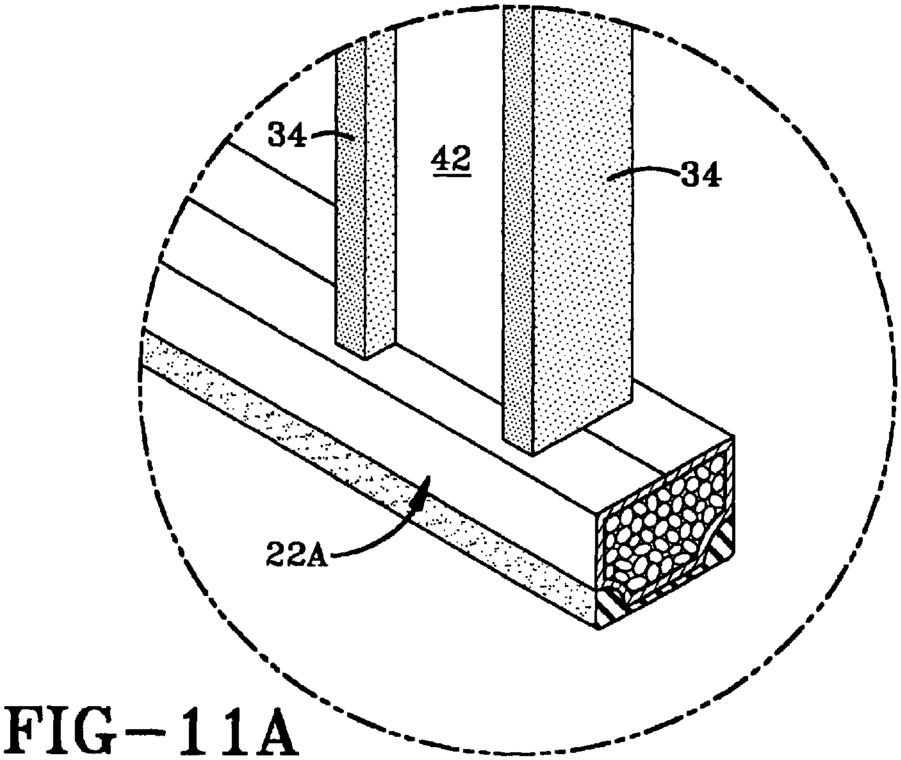
FIG. 11A is a view similar to FIG. 11 showing the muntin bar used with a traditional metal spacer.
Figure 11B:
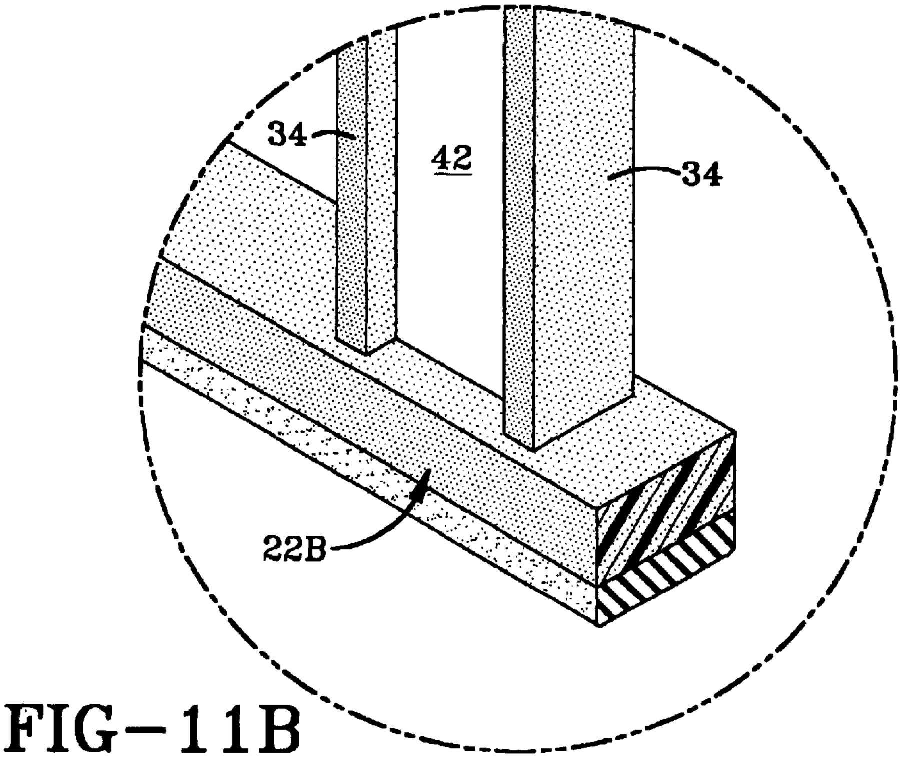
FIG. 11B is a view similar to FIG. 11 showing the muntin bar used with a foam spacer.

When cutting an external material strip 34, the length dimension is simply calculated by subtracting the one thickness T from the dimension E (for example, the external dimension E in FIG. 4) taken from the end of grid element 42 or 44 to the edge of notch 82. This dimension calculation is used if the manufacturer desires material strips 34 to end flush with the end of element 42, 44 as shown in FIGS. 11A and 11B. Another dimension calculation is performed in an alternative embodiment when the manufacturer wants material strips 34 to have flaps 104 that extend past plates 58 of clips 50 and into spacer 22. Flaps 104 are desired in the art because they block the sides of clips 50 from view as shown in FIGS. 10 and 11 and visually join the muntin bar with the desiccant matrix 24 disposed in spacer 22. When material strips 34 are fabricated to be the same color as desiccant matrix 24, flaps 104 provide a smooth, continuous look to window 10 or 12 by eliminating visual breaks between grid 30 and spacer 22. The specific dimension of flap 104 is not critical to the invention. Flap 104 need only extend into spacer 22 and cover at least plate 58 although it is desired that flap 104 be long enough to cover the view of hooks 54. In the preferred embodiment, flap 104 is dimensioned so that it is closely adjacent matrix 24 as shown in FIGS. 12 and 13.

It may be understood that flaps 104 may fit within spacer 22 because material strips 34 are fabricated to have an overall width that is somewhat less than the total width between the interior surfaces of glass sheets 18 and 20 as depicted in FIG. 3. Material strips 34 thus fit in between the flanges 106 of spacer 22. In some cases, flanges 106 may contact material strip 34 or may cause the edges of material strip 34 to be crimped.

Figure 15:
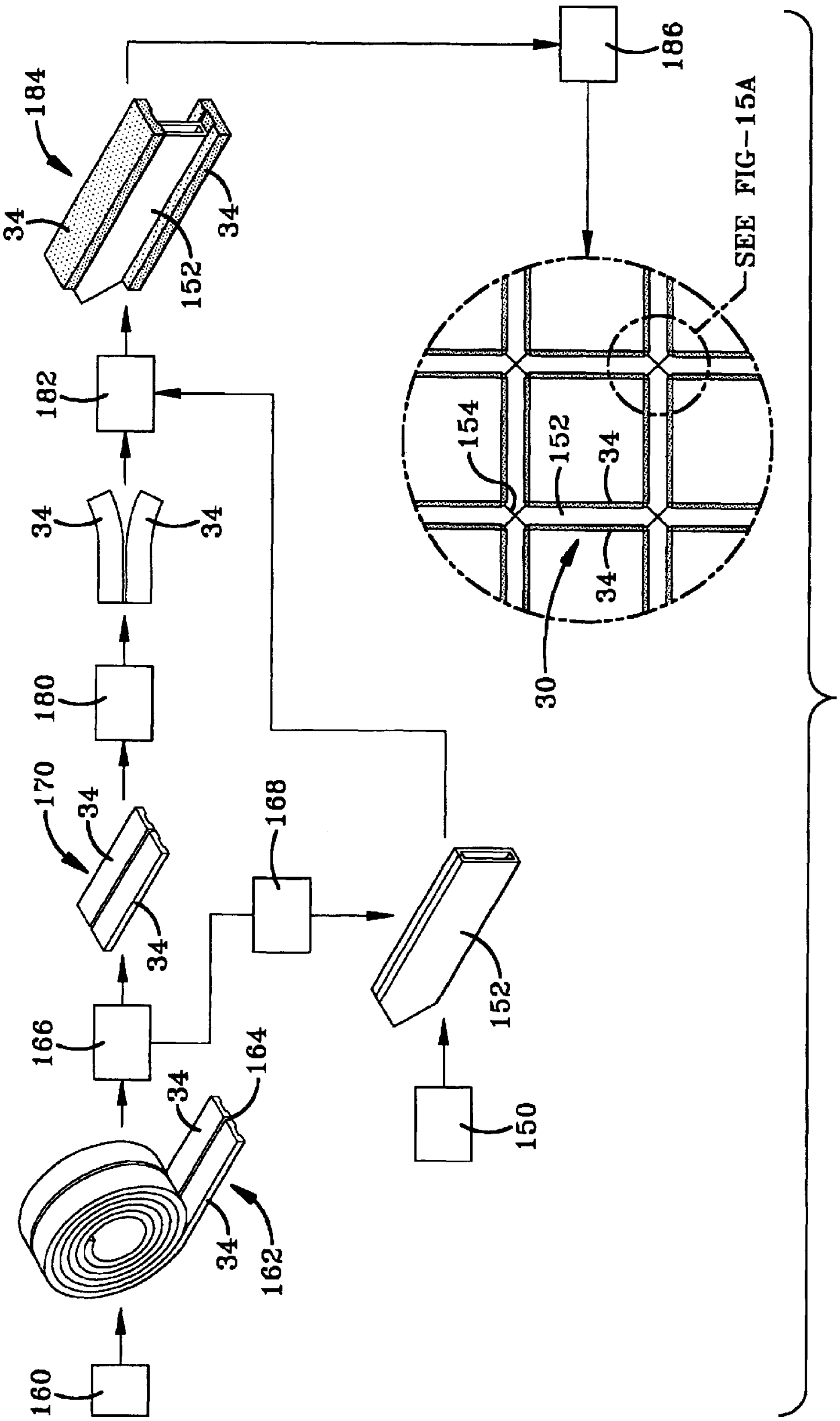
FIG. 15 is a schematic view of the method of manufacturing a muntin bar grid according to another embodiment of the present invention.

Another embodiment of the method of the present invention is depicted schematically in FIG. 15. In this embodiment, a supply 150 of muntin grid elements 152 is provided. Supply 150 provides enough muntin grid elements 152 so that grid 30 may be fabricated. Muntin grid elements 152 may be the same as elements 42, 44 described above or may be any of a variety of muntin grid elements known in the art. Such known muntin grid elements may not use notches 82 at the intersections. In one example, each end of element 152 is tapered as at 154 so that four elements 152 fit together smoothly at an intersection. In other embodiments, a cross-shaped clip (not shown) is used to hold elements 152 together at the intersections. The clip is designed to form a smooth connection between the ends of elements 152.

Figure 21:
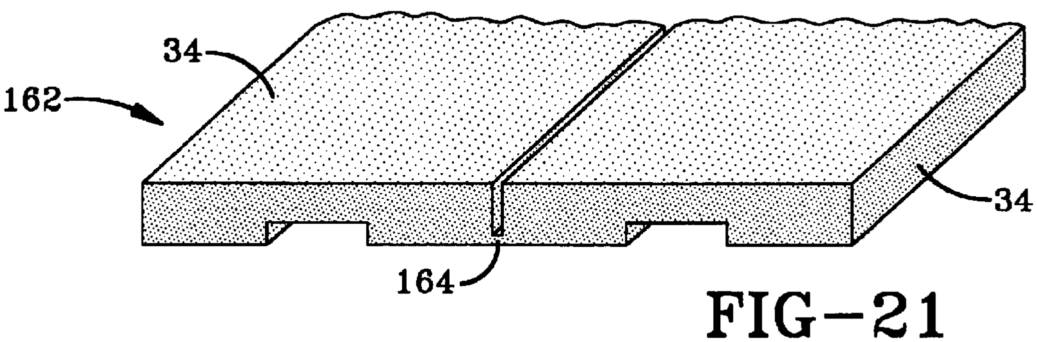
FIG. 21 is an end view of the material strips joined together in pairs.

A supply of material strip stock 160 is provided with the stock 162 including two lengths of material strip 34 joined at an inner corner 164 (see FIG. 21). Stock 162 allows material strips 34 to be formed in essentially identical pairs that are applied to opposed edges of elements 152. Fabricating stock 162 in the dual configuration depicted in FIG. 21 also allows twice as much stock 162 to be fabricated in essentially the same amount of time.

Stock 162 is next cut to length with a cutting apparatus 166. Cutting apparatus 166 may be in communication with a controller that is programmed with the grid configuration and to provide the cut dimensions to cutting apparatus 166. However, in the method depicted in FIG. 15, cutting apparatus 166 is in communication with a measuring apparatus 168 that measures elements 152 as they are presented. Measuring apparatus 168 measures the length of element 152 and provides the length to cutting apparatus 166 that then cuts stock 162 into lengths 170 of joined material strips. Either cutting apparatus 166 or measuring device 168 may perform the calculations to provide spaces 102 or flaps 104.

Lengths 170 are then separated into individual material strips 34 by an appropriate device 180. Any of a variety of separation devices 180 may be used to separate strips 34. For instance, lengths 170 may be run through a dividing element, such as a pin or blade, that breaks the connection between strips 34. Separated strips 34 are then positioned on opposed edges of element 152 and are connected thereto by a laminating apparatus 182. This method thus allows material strips 34 to be simultaneously cut and simultaneously applied. The resulting muntin grid piece 184 may be assembled at an assembly step 186 into grid 30.

One advantage of providing joined stock 162 is that only a single roll of stock 162 needs to be replaced at a time thus eliminating the downtime in practicing the method. Another advantage is when material strips 34 contain desiccant. In this situation, only one roll of stock is exposed to the air at a time thus allowing the desiccant to be more effective when installed in window 10 or 12. Another advantage is that the opposed lengths of material strip 34 are accurately cut because they are being simultaneously cut. The method is also faster because strips 34 are being simultaneously formed and simultaneously applied to the opposed edges of element 152. The method does not require element 152 to wait while the second strip is fabricated and then applied.

Figure 5:
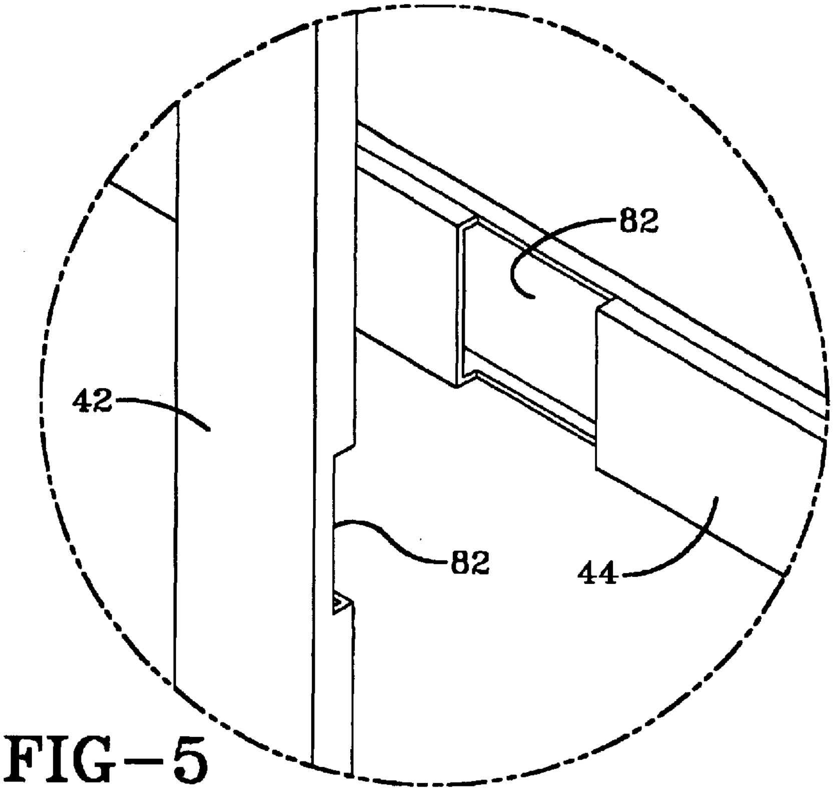
FIG. 5 is an enlarged perspective view of the encircled portion of FIG. 4.
Figure 6:
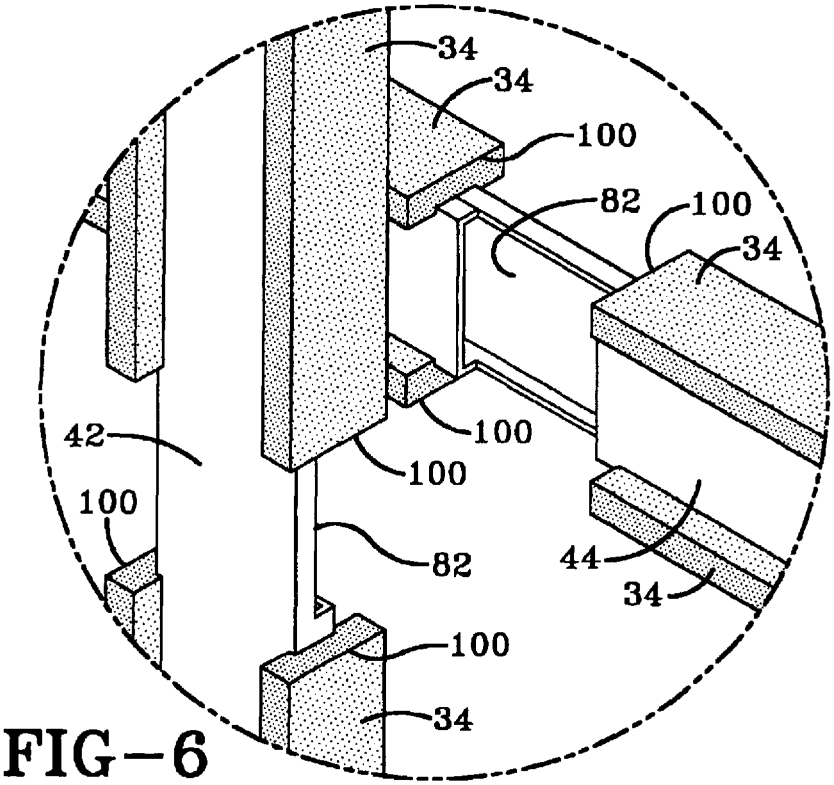
FIG. 6 is a view similar to FIG. 5 showing the material strips applied to the muntin grid elements before the grid is assembled.
Figure 7:
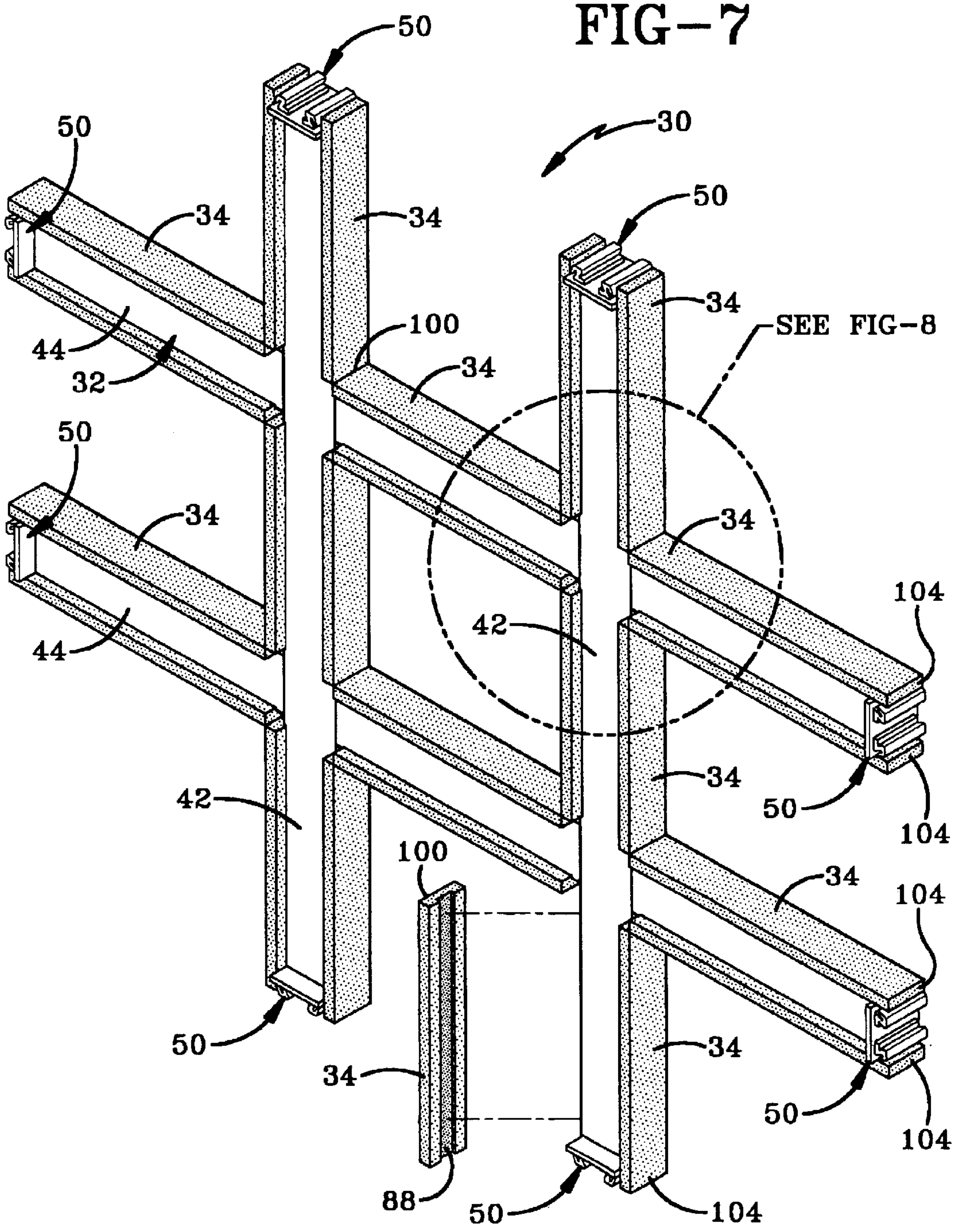
FIG. 7 is a perspective view of a muntin bar grid fabricated with the method of the present invention.
Figure 15A:
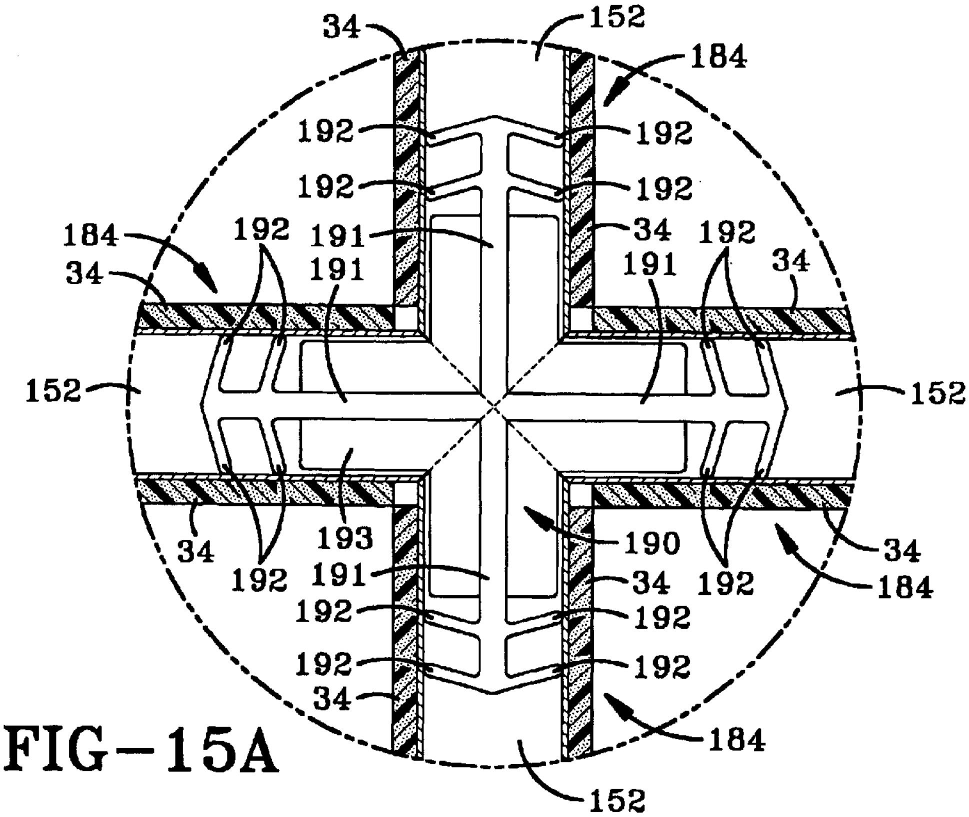
FIG. 15A is a sectional view of an intersection showing a cross connector holding four muntin bar sections together.
Figure 15B:
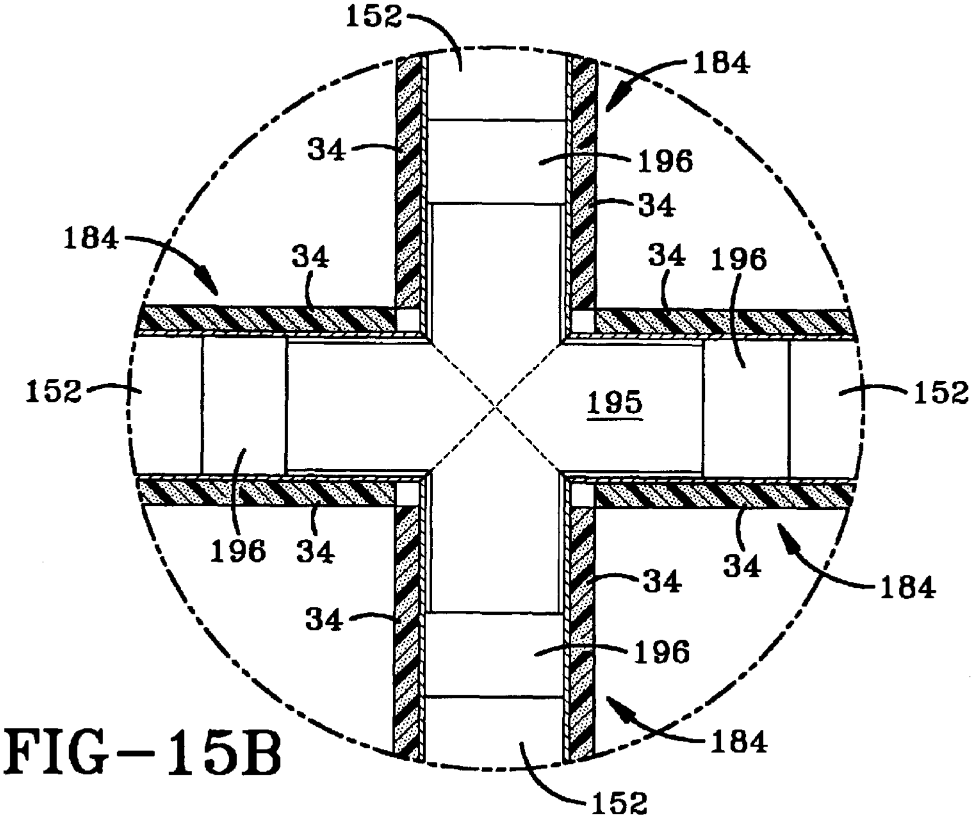
FIG. 15B is a sectional view showing an alternative cross connector construction.

FIGS. 15A and 15B show alternative cross connectors that may be used to connected muntin grid pieces 184 into grid 30. Cross connector 190 of FIG. 1 5A includes four arms 191 that each include outwardly projecting fingers 192. Fingers 192 frictionally engage the inner surface of elements 152 to join pieces 184 together. Connector 190 may also include a body 193 that snugly fits within each element 152 to keep elements 152 perpendicular and square to each other. Cross connector 194 of FIG. 15B includes a cross-shaped body 195 that extends into each end of elements 152. A resilient protrusion 196 is disposed at the end of each arm of body 195. Protrusion 196 frictionally engages the inner surface of each element to hold elements square to each other. Protrusion 196 may be a foam material, a rubber material, or a resilient plastic material that has suitable frictional properties for holding elements 152 together.

Figure 16:
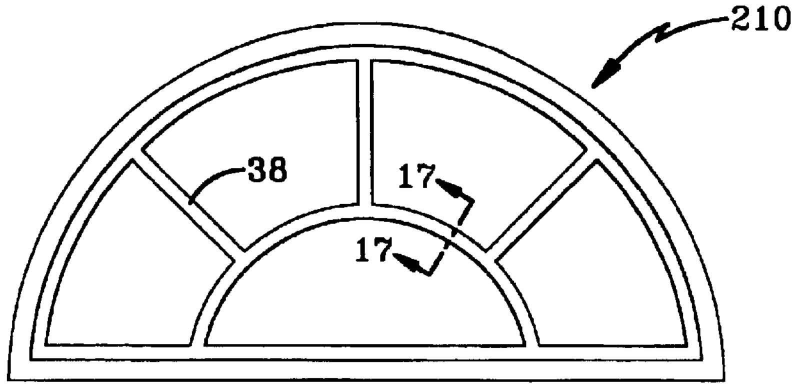
FIG. 16 is a front elevational view of a simulated divided lite window having curved muntin bars using a first alternative embodiment of the material strips.
Figure 17:
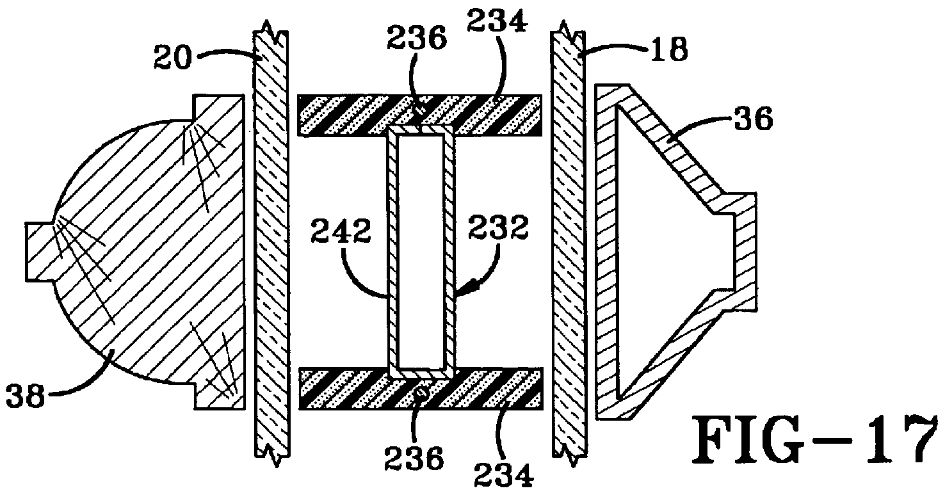
FIG. 17 is a sectional view taken along line 17—17 of FIG. 16.

A first alternative material strip configuration is generally indicated by the numeral 234 is FIGS. 16–17. Material strips 234 include at least one section of a non-extensible material 236 that prevents material strips 234 from stretching when applied to inner muntin grid 232. Although this feature is useful when material strips 234 are applied to straight muntin grid elements such as elements 42 and 44 described above, this feature is especially useful when material strips 234 are applied to the outside of curved muntin grid elements 242 as shown in FIGS. 16–17. When material strips 234 are stretched during application, they eventually relax back to their unstretched configuration and can become Is disconnected or delaminated from inner muntin grid 232. Such disconnected material strips degrade the appearance of window unit 210. The problem of stretching material strips during application may also occur when material strips are automatically laminated to elements 42 and 44 by laminater 92.

Figure 18:
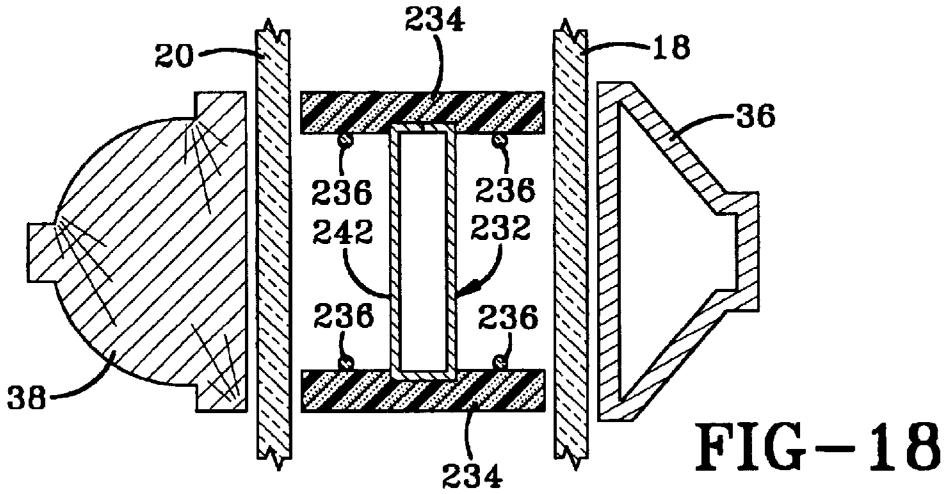
FIG. 18 is a view similar to FIG. 17 showing a second alternative embodiment of the material strips including a non-extensible material.

In the first alternative embodiment of the invention, material strip 234 has 20 section of non-extensible material 236 embedded within the body of material strip 234. Section 236 may be substantially centered within the body of material strip 234 as depicted in FIG. 17. In the second alternative embodiment of the invention (FIG. 18), section 236 is disposed on the surface of material strip 234 and is combined with a second section 236 disposed on the other side of grid 232. Non-extensible material sections 236 may be preferably fabricated from a glass fiber material and combined with material strip 234 when material strip 234 is fabricated. Section 236 may also be fabricated from any of a variety of materials known in the art that will help prevent material strip 234 from stretching during application. It is desired that sections 236 extend substantially throughout the longitudinal lengths of material strips 234.

Figure 19:
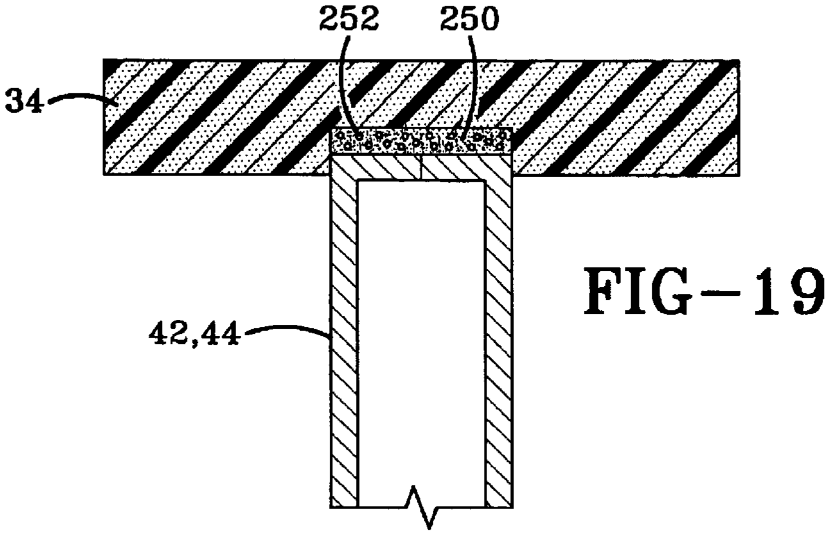
FIG. 19 is a view similar to FIG. 17 showing a third alternative embodiment of the material strips including a non-extensible material.

A third alternative embodiment is depicted in FIG. 19 where element 42, 44 is connected to material strip 34 with an adhesive 250 having a plurality of non-extensible fibers 252 disposed therein. Fibers 252 prevent material strip 34 from stretching during application of material strip 34 to element 42, 44. The specific orientation of fibers 252 within adhesive 250 is not critical to the invention. For instance, fibers 252 may all be longitudinally disposed, may be uniformly angled within adhesive 250, or may be overlapping in a cross-hatch pattern. Fibers 252 may also be randomly disposed in adhesive 250.

Figure 20:
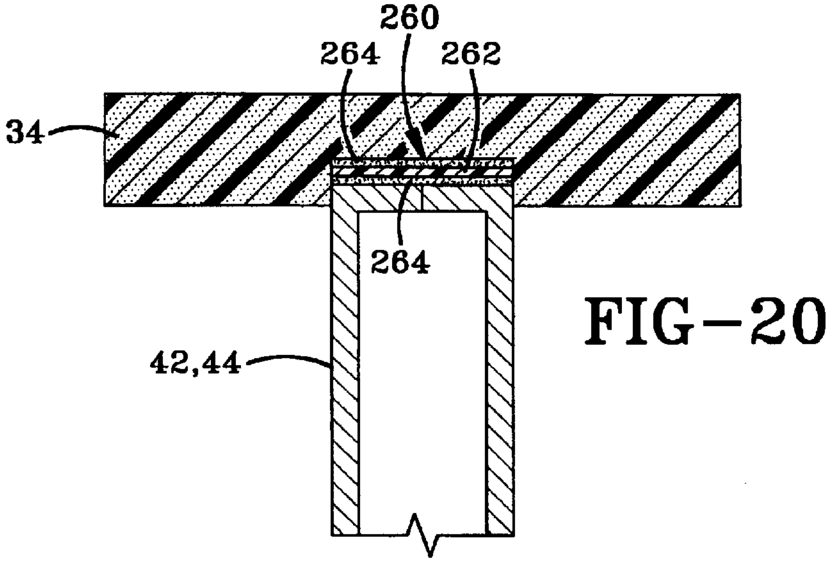
FIG. 20 is a view similar to FIG. 17 showing a fourth alternative embodiment of the material strips including a non-extensible material.

A fourth alternative embodiment is depicted in FIG. 20 where material strip 34 is connected to element 42, 44 by an adhesive assembly 260 having an inner non-extensible layer 262 coated with adhesive 264 on both sides. Layer 262 may be a Mylar material or any of a variety of other materials known in the art. Assembly 260 prevents material strip 34 from stretching during application to element 42, 44 because layer 262 does not stretch.

Another delamination problem occurs when the adhesive connecting the material strips to the muntin grid elements fails. The embodiments of the material strips depicted in FIGS. 22–26A prevent delamination caused by adhesive failure. Each of these embodiments may be used with or without adhesive.

Figure 22:
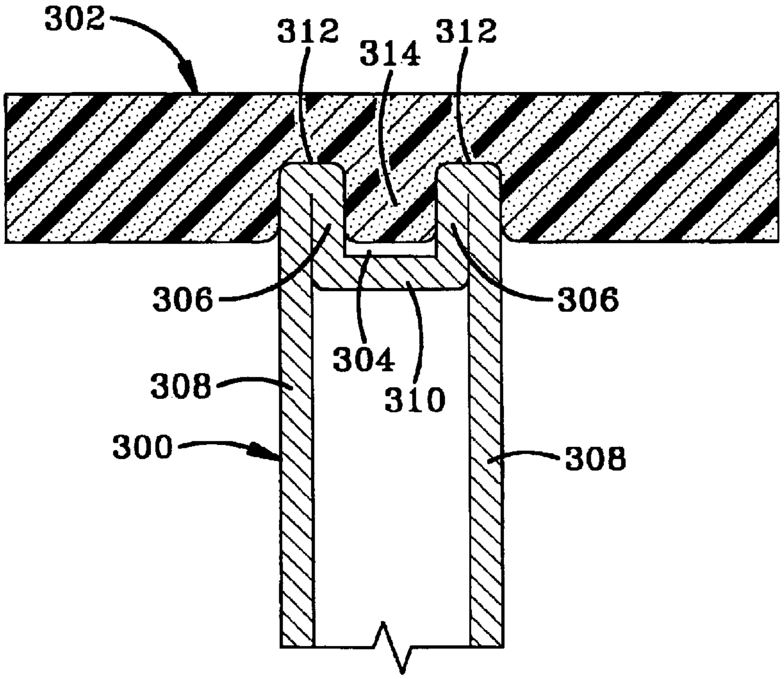
FIG. 22 is a view similar to FIG. 19 showing a first alternative embodiment of the material strips and muntin bars wherein a mechanical connection is created between the material strip and the muntin bar.
Figure 22A:
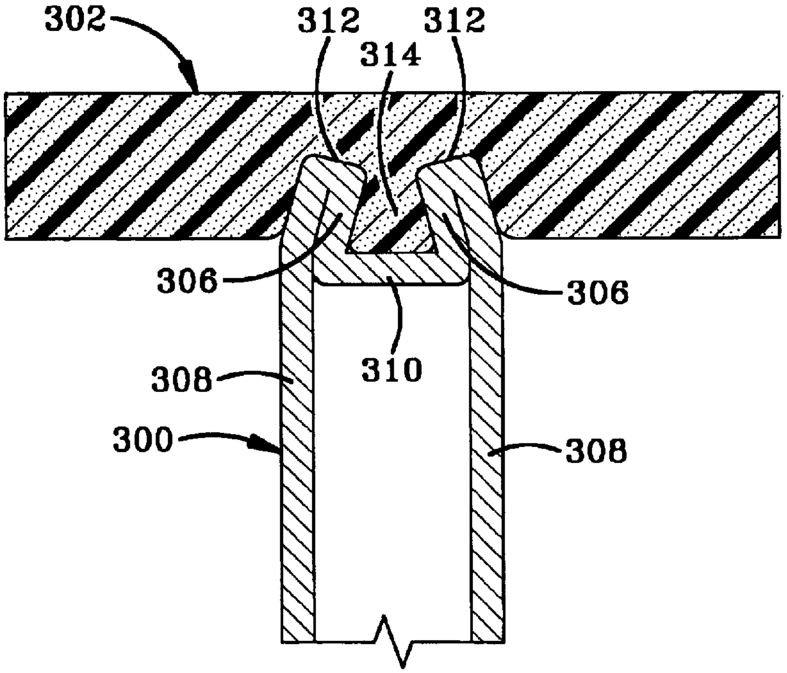
FIG. 22A is a view of the muntin bar and strip of FIG. 22 after the ends of the muntin bar have been crimped.

A first alternative embodiment of the material strips and muntin grid element wherein a mechanical connection is created between the material strip and muntin grid element is depicted in FIGS. 22 and 22A. In this embodiment, the inner muntin grid element is connected to the material strip with a mechanical connection that may or may not be combined with an adhesive connection. The mechanical connection prevents delamination of the material strip from the grid element due to adhesive failure.

In FIG. 22, the grid element is indicated by the numeral 300 and the material strip is indicated by the numeral 302. Only half (one edge) of grid element 300 is depicted in FIG. 22 and only one material strip 302 is depicted in FIG. 22 so that the detail of the connection may be seen. FIG. 22 represents about half of a mirror image wherein the lower portion of grid element 300 is substantially identical to the upper half depicted in the drawings. As such, a second material strip 302 is connected to the lower half of grid element 300 in a similar fashion.

Grid element 300 includes a channel 304 formed along both of its edges by folding back two arms 306 against the sidewalls 308. Grid element 300 also includes a base wall 310 that extends between arms 306 and forms the bottom of channel 304.

Material strip 302 defines a pair of spaced channels 312 that are configured to receive the folded edges of grid element 300. Channels 312 are defined by a protrusion 314 formed in the center of the bottom wall of material strip 302. Protrusion 314 is configured to fit snugly or frictionally within channel 304 so that material strip 302 may be mechanically connected to grid element 300 without the use of adhesive. In some embodiments, the manufacturer may wish to place an adhesive in channel 304 to form a mechanical and adhesive connection between grid element 300 and material strip 302.

In some applications, the manufacturer may wish to create a stronger connection between material strip 302 and grid element 300. In these situations, the manufacturer crimps the edges of sidewalls 308 toward each other as depicted in FIG. 22A. The crimping pinches protrusion 314 in channel 304 and forms a stronger mechanical connection between grid element 300 and material strip 302. The crimping may be achieved by running forming wheels against the edges of sidewalls 308 where sidewalls 308 engage material strip 302.

Figure 23:
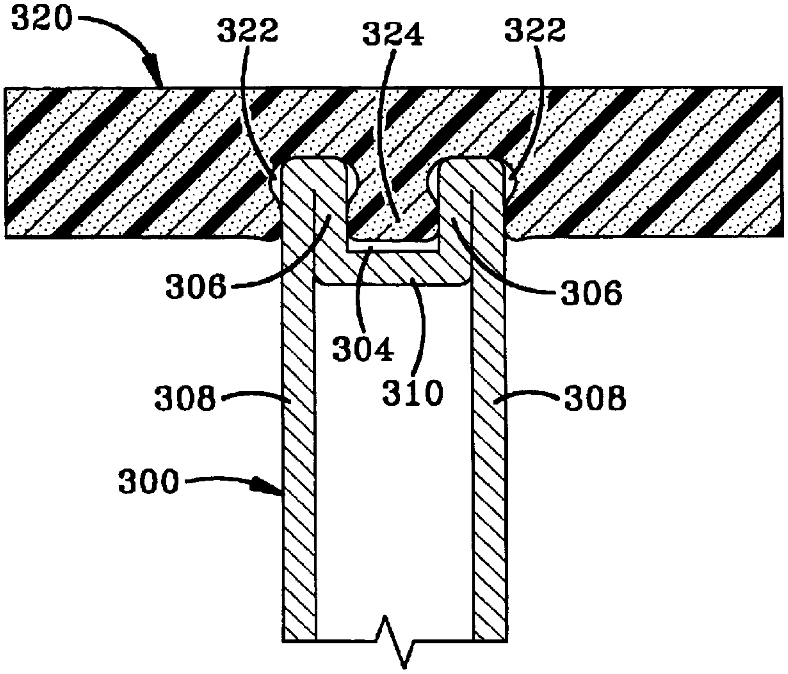
FIG. 23 is a view similar to FIG. 22 showing a second alternative embodiment of the material strips and muntin bars wherein a mechanical connection is created between the material strip and the muntin bar.

A second alternative embodiment of the material strip and muntin grid element is depicted in FIG. 23. In this embodiment, grid element 300 remains substantially the same as described above with respect to the first embodiment of the mechanical connection. In this embodiment, the material strip is indicated by the numeral 320. Material strip 320 also defines a pair of channels 322 that receive the edges of sidewalls 308. Channels 322 each have an opening having a width smaller than the thickness of the combination of arm 306 and sidewall 308 such that the body of material strip 320 must be deformed for grid element 300 to be fit into channels 322. As described above, material strip 320 is fabricated from a resilient material and a deformation of the resilient material creates a resilient force against arms 306 and sidewalls 308. Channels 322 preferably include a base area having a width larger than the combination of arm 306 and sidewall 308 so that grid element 300 is not readily forced out of channels 322 by the resilient force.

Figure 24:
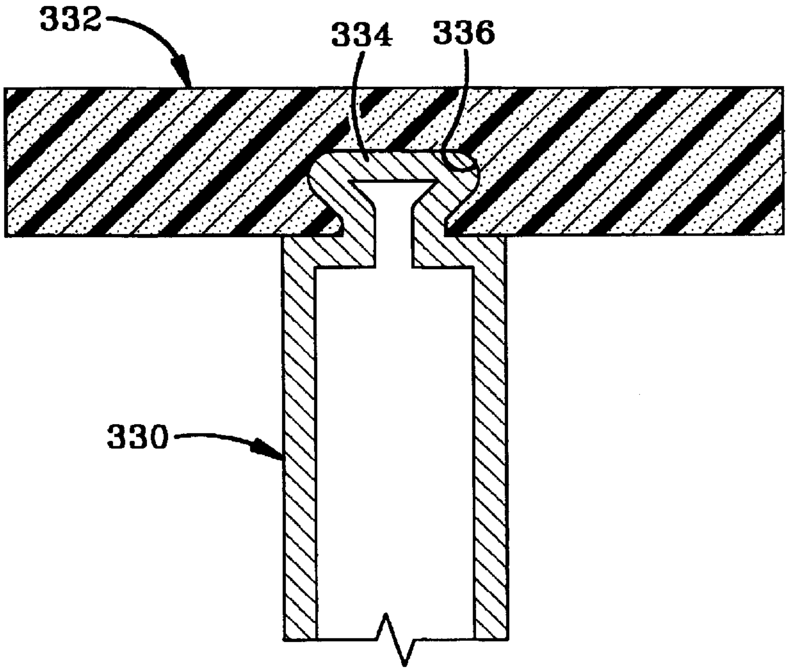
FIG. 24 is a view similar to FIG. 22 showing a third alternative embodiment of the material strips and muntin bars wherein a mechanical connection is created between the material strip and the muntin bar.

FIG. 24 depicts a third alternative embodiment of the material strips and muntin grid elements wherein a mechanical connection connects the material strips to the grid elements. In this embodiment, the grid element is indicated by the numeral 330 with the material strip being indicated by the numeral 332. Grid element 330 includes a protrusion 334 having a cross section in the shape of a male dovetail. Material strip 332 defines a channel 336 having a cross shape of the female dovetail configured to compliment the cross section of protrusion 334. Although the dovetail connection depicted in FIG. 24 has angled walls similar to a traditional dovetail, the dovetail connection may be rectangular, round, or triangular without departing from the concepts of the present invention. The dovetail connection between protrusion 334 and channel 336 provides a mechanical connection between grid element 330 and material strip 332 that prevents delamination. Material strip 332 is fabricated from a material resilient enough to snap around protrusion 334 when material strip 332 is initially installed.

Figure 25:
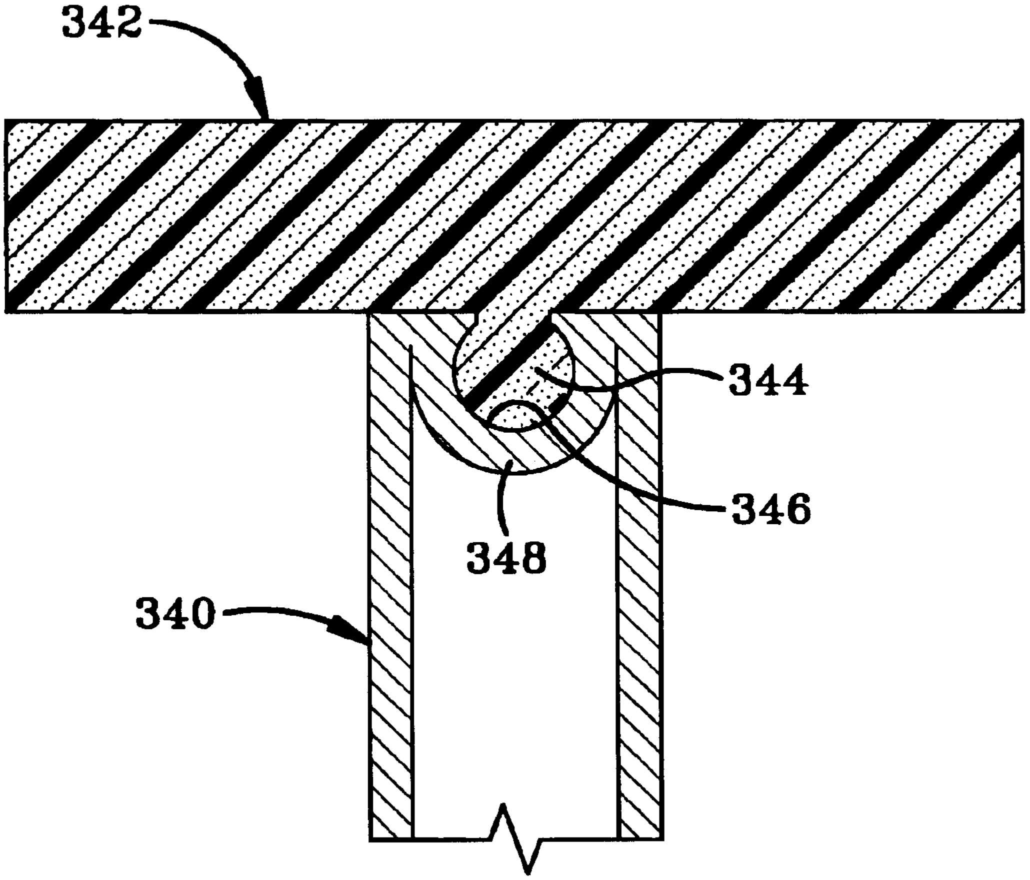
FIG. 25 is a view similar to FIG. 22 showing a fourth alternative embodiment of the material strips and muntin bars wherein a mechanical connection is created between the material strip and the muntin bar.

A fourth alternative embodiment of the material strip and grid element is depicted in FIG. 25. In this embodiment, the grid element is indicated by the numeral 340 with the material strip being indicated by the numeral 342. Material strip 342 includes a protrusion 344 that is received in a channel 346 defined by a wall 348 formed in the edge of grid element 340. Protrusion 344 and channel 346 are dovetailed in a manner similar to that described above with respect to FIG. 24 except that the male dovetail element extends from material strip 342 with the female dovetail element being formed in grid element 340. In this embodiment, the dovetail elements have a round cross section.

Figure 26:
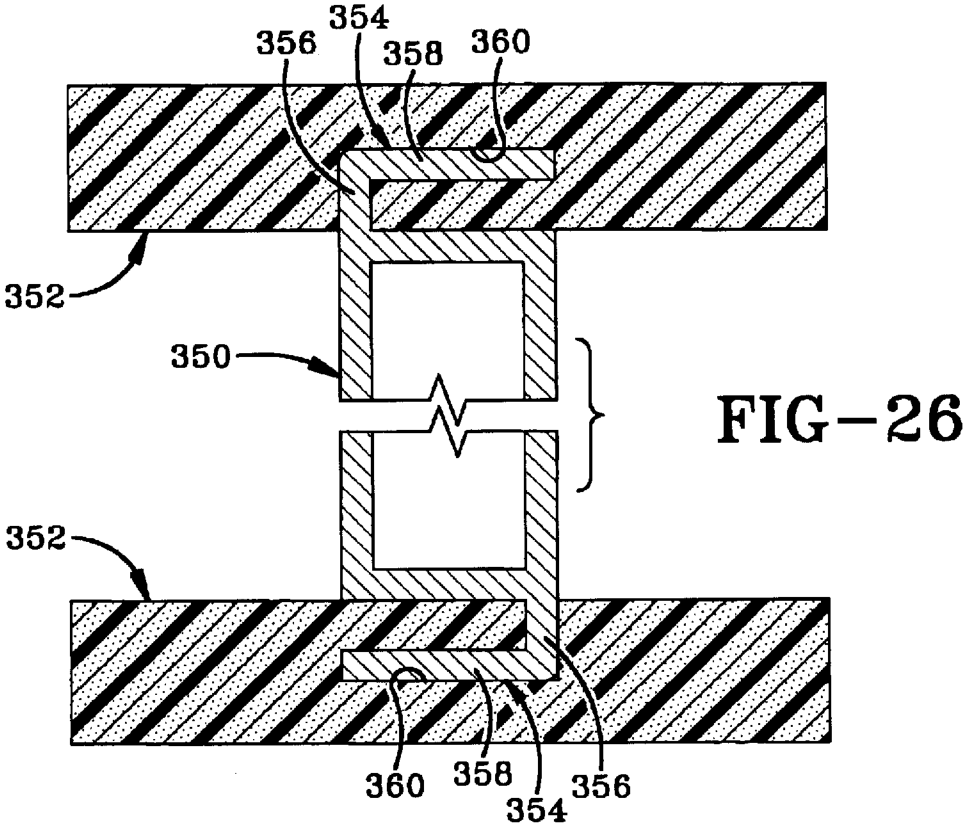
FIG. 26 is a view similar to FIG. 22 showing a fifth alternative embodiment of the material strips and muntin bars wherein a mechanical connection is created between the material strip and the muntin bar.
Figure 26A:
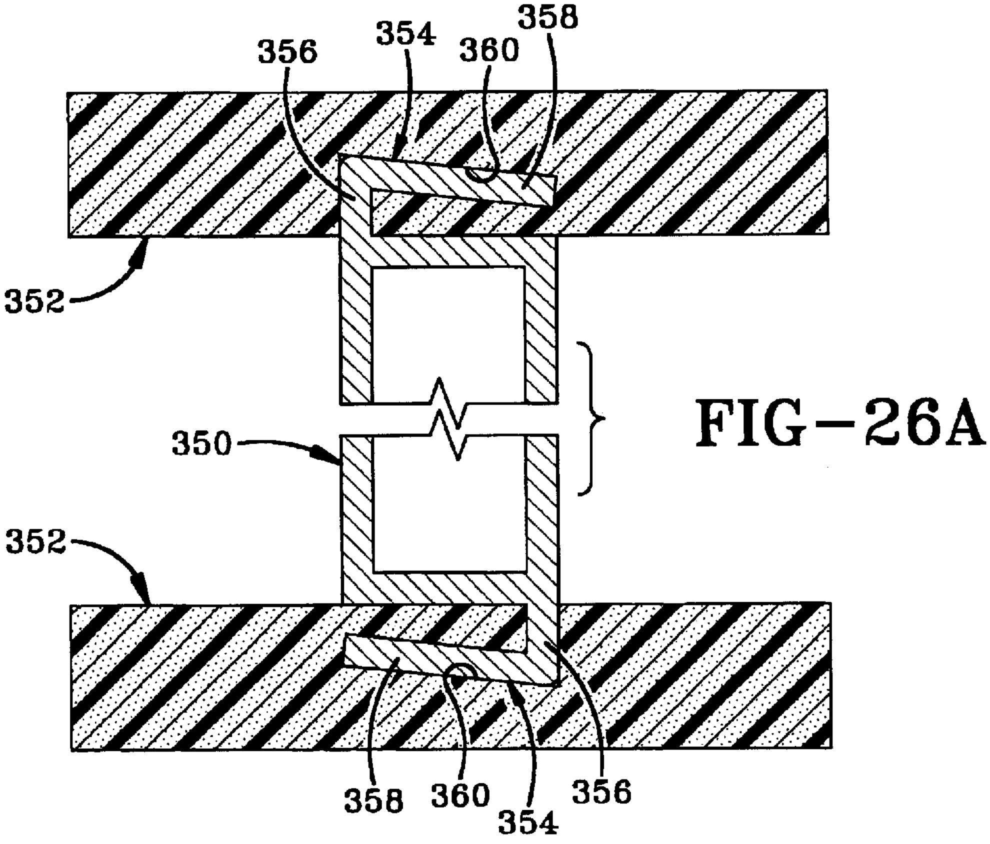
FIG. 26A is a view of the muntin bar and strip of FIG. 26 after the ends of the muntin bar have been crimped.

FIGS. 26 and 26A depict a fifth alternative embodiment of the material strips and grid elements wherein a mechanical connection secures the two elements together. In this embodiment, the grid elements are indicated by the numeral 350 with the material strips being indicated by the numeral 352. Grid element 350 includes a projecting arm 354 that extends up away from the main body of grid element 350 with a first portion 356 and back across with a second portion 358 that extends substantially perpendicular to first portion 356. Arm 354 is received in a complimentary channel 360 defined by material strip 352. Material strip 352 is flexible and resilient enough to allow arm 354 to be slid or hooked into channel 360. A mechanical connection is formed once arms 354 are received in channels 360 as depicted in FIG. 26.

The manufacturer may crimp arms 358 inwardly toward the main body of grid element 350 as depicted in FIG. 26A to secure the mechanical connection. The crimping may occur in a variety of ways that apply force against arms 358.

Accordingly, the invention is simplified, provides an effective, safe, inexpensive, and efficient device that achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the invention is performed, the characteristics of the method, and the advantageous new and useful results obtained; the new and useful structures, devices, elements, arrangements, parts, and combinations are set forth in the appended claims.

What is claimed is:

1. A method for fabricating a muntin bar grid for a window comprising the steps of:

(a) providing at least two muntin grid elements;

(b) providing at least two material strips;

(c) connecting at least one material strip to each of the muntin grid elements to form two muntin grid pieces; and (d) assembling the at least two muntin grid pieces together to form a muntin bar grid after the material strips are connected to the muntin grid elements.

2. The method of claim 1, further comprising the steps of forming notches in the muntin grid elements before step (c).

3. The method of claim 2, wherein step (d) includes the step of mating the notches of the muntin grid elements to form the muntin bar grid.

4. The method of claim 1, further comprising the steps of providing a controller and automated equipment, inputting window size data into the controller, and using the automated equipment to create the muntin bar elements and material strips.

5. The method of claim 1, wherein the step of providing at least two muntin grid elements is free of the step of painting the muntin grid elements.

6. The method of claim 1, wherein step (b) includes the steps of determining the location of the material strips with respect to the grid and cutting the material strips to a length related to the location of the material strip with respect to the grid.

7. The method of claim 1, further comprising the step of using a computer to control the steps of providing at least two muntin grid elements and at least two material strips.

8. The method of claim 1, further comprising the steps of providing additional material strips and connecting the additional material strips to the muntin grid elements before step (d) occurs.

9. The method of claim 1, wherein step (b) and (c) are performed on automated equipment.

10. The method of claim 1, further comprising the step of providing a measuring apparatus to measure the length of the muntin grid element.

11. The method of claim 10, further comprising the step of calculating a length measurement for the material strip based on the length of the muntin grid element measured by the measuring apparatus.

12. The method of claim 1, wherein step (a) includes the step of roll forming the muntin grid element.

13. The method of claim 12, further comprising the step of cutting the roll formed muntin grid element to a length for the muntin bar grid.

14. The method of claim 13, further comprising the steps of providing a controller; determining the height and width of the window wherein the muntin bar grid will be installed; and using the controller to determine the muntin grid configuration based on the height and width of the window.

15. The method of claim 14, further comprising the step of using the controller to determine the number and sizes of material strips for the grid configuration.

16. The method of claim 15, wherein step (c) is controlled by the controller.

17. The method of claim 1, wherein step (b) includes the step of forming the material strip stock in combination with a length of non-extensible material connected to the material strip stock.

18. The method of claim 17, further comprising the step of embedding the length of non-extensible material within the material strip stock.

19. The method of claim 1, wherein step (b) includes the step of providing the material strip stock with adhesive and providing the adhesive with a non-extensible member.

20. The method of claim 1, wherein step (e) includes the step of providing a laminater and using the laminater to connect the material strips to the muntin grid elements.

21. The method of claim 1, wherein step (c) includes the step of determining if the muntin grid element is an internal element or an external element.

22. The method of claim 21, further comprising the step of calculating the length of the internal material strips by determining the length between muntin grid elements and subtracting twice the thickness of the material strip.

23. The method of claim 22, further comprising the step of calculating the length of the external material strips by determining the length from the intersection to the end of the muntin grid element.

24. The method of claim 23, further comprising the step of adding extra length to the length of the external material strip to form a flap.

25. The method of claim 24, further comprising the steps of connecting a clip to the end of the muntin grid element and positioning the flap of the material strip over the clip.

26. The method of claim 25, further comprising the steps of:

providing a spacer having an inwardly facing open channel;

mounting the muntin grid piece into the spacer; and inserting the flaps of the material strips into the channel of the spacer.

27. The method of claim 1, wherein step (a) is free of the step of painting the muntin grid elements.

28. The method of claim 1, wherein step (c) includes the step of forming a mechanical connection between the material strips and the muntin grid element.

29. A method for fabricating a muntin bar grid for a window comprising the steps of:

(a) providing a controller;

(b) providing automated equipment in communication with the controller;

(c) providing a supply of raw material strip stock;

(d) supplying window data to the controller;

(e) using the automated equipment to create muntin grid elements and material strips based on the window data (f) connecting at least one material strip to each of the muntin grid elements to form muntin grid pieces; and (g) assembling the muntin grid pieces together to form a muntin bar grid after the material strips are connected to the muntin grid elements.

30. The method of claim 29, wherein step (e) includes the step of determining if the muntin grid element is an internal element or an external element.

31. The method of claim 30, further comprising the step of calculating the length of the internal material strips by determining the length between muntin grid elements and subtracting twice the thickness of the material strip.

32. The method of claim 31, further comprising the step of calculating the length of the external material strips by determining the length from the intersection to the end of the muntin grid element.

33. The method of claim 29, wherein step (f) includes the step of providing a laminater and using the laminater to connect the material strips to the muntin grid elements.

* * * * *